(12) United States Patent
Carbonera et al.

(10) Patent No.: US 9,159,162 B2
(45) Date of Patent: Oct. 13, 2015

(54) METHOD AND SYSTEM FOR GENERATING A MULTI-DIMENSIONAL SURFACE MODEL OF A GEOMETRIC STRUCTURE

(75) Inventors: Carlos Carbonera, St. Paul, MN (US); Vasily Vylkov, Blaine, MN (US); Daniel R. Starks, Lake Elmo, MN (US); Jiang Qian, Edina, MN (US); Eric J. Voth, Maplewood, MN (US)

(73) Assignee: St. Jude Medical, Atrial Fibrillation Division, Inc., St. Paul, MN (US)

( * ) Notice: Subject to any disclaimer, the term of this patent is extended or adjusted under 35 U.S.C. 154(b) by 768 days.

(21) Appl. No.: 13/338,381

(22) Filed: Dec. 28, 2011

(65) Prior Publication Data

US 2013/0169638 A1    Jul. 4, 2013

(51) Int. Cl.
*G06T 17/00* (2006.01)
*G06T 15/00* (2011.01)

(52) U.S. Cl.
CPC .............. *G06T 17/00* (2013.01); *G06T 2210/12* (2013.01)

(58) Field of Classification Search
CPC .............................. G06T 17/00; G06T 2210/12
See application file for complete search history.

(56) References Cited

U.S. PATENT DOCUMENTS

| | | | |
|---|---|---|---|
| 6,226,542 B1 | 5/2001 | Reisfeld | |
| 6,233,476 B1 | 5/2001 | Strommer et al. | |
| 6,377,865 B1 | 4/2002 | Edelsbrunner et al. | |
| 6,498,944 B1 | 12/2002 | Ben-Haim et al. | |
| 6,690,963 B2 | 2/2004 | Ben-Haim et al. | |
| 6,771,840 B1 * | 8/2004 | Ioannou et al. | 382/285 |
| 6,788,967 B2 | 9/2004 | Ben-Haim et al. | |
| 7,197,354 B2 | 3/2007 | Sobe | |
| 7,263,397 B2 | 8/2007 | Hauck et al. | |
| 7,317,456 B1 * | 1/2008 | Lee | 345/427 |
| 7,386,339 B2 | 6/2008 | Strommer et al. | |
| 7,443,394 B2 | 10/2008 | Anderson et al. | |
| 7,542,036 B2 | 6/2009 | Museth et al. | |
| 7,903,113 B2 | 3/2011 | Krishnan et al. | |
| 7,920,996 B2 | 4/2011 | Harada | |

(Continued)

FOREIGN PATENT DOCUMENTS

| | | |
|---|---|---|
| JP | 2001061789 | 3/2001 |
| JP | 2008259697 | 10/2008 |

OTHER PUBLICATIONS

"International Search Report & Written Opinion", PCT/US2012/065201 Feb. 1, 2013.

(Continued)

*Primary Examiner* — Kee M Tung
*Assistant Examiner* — Frank Chen
(74) *Attorney, Agent, or Firm* — Dykema Gossett PLLC

(57) ABSTRACT

A method of constructing a bounding box comprises: acquiring a set of sensed data points; adding, for each sensed data point, at least one calculated data point; and defining a bounding box containing the sensed and calculated data points. A method of identifying voxels in a voxel grid corresponding to a plurality of data points comprises: calculating, for each data point, a distance between it and each voxel; creating a subset of voxels comprising voxels having a distance from one data point that is less than a predetermined distance; creating another subset comprising those voxels that neighbor a voxel in the first subset; computing, for each voxel in the second subset, a distance between it and each voxel in the first subset; and identifying each voxel in the first subset that is a distance away from each voxel in the second subset that exceeds a predetermined distance.

20 Claims, 20 Drawing Sheets

(56) References Cited

U.S. PATENT DOCUMENTS

| | | | |
|---|---|---|---|
| 7,988,639 | B2 | 8/2011 | Starks |
| 8,000,941 | B2 | 8/2011 | Olson |
| 2005/0212795 | A1 | 9/2005 | Anderson et al. |
| 2007/0057945 | A1 | 3/2007 | Olson |
| 2008/0297507 | A1* | 12/2008 | Chen et al. .................... 345/424 |
| 2009/0167755 | A1 | 7/2009 | Voth |
| 2009/0171627 | A1 | 7/2009 | Olson |

OTHER PUBLICATIONS

Pateiro-Lopez, B. et al. "Generalizing the Convex Hull of a Sample: The R Package Alphahull," Journal of Statistical Software, vol. 34, Issue 5 (Apr. 2010).

Edelsbrunner, Herbert et al., "On the Shape of a Set of Points in the Plane," Transactions on Information Theory, vol. IT-29, No. 4 (Jul. 1983).

Bourke, P., "Polygonising a Scalar Field," May 1994 [online] [retrieved on Mar. 26, 2012]. Retrieved from the internet: <URL: http://local.wasp.uwa.edu.au/~pbourke/geometry/polygonise/>.

Hussain et al., "LOD Modelling of Polygonal Models", Machine Graphics & Vision International Journal, vol. 14, Issue 3, Jan. 2005, pp. 325-343.

Hussain, "Fast and Reliable Decimation of Polygenal Models Based on Volume and Normal Field", Proceedings of the 6th International Conference on Advances in Visual Computing, vol. Part I, Nov. 29, 2010, pp. 64-73.

Jia et al., "Fast Mesh Simplification Algorithm Based on Edge Collapse", Intelligent Control and Automation, Lecture Notes in Control and Information Sciences, vol. 344, Aug. 16-19, 2006, pp. 275-286.

Jiang et al., "Complex model simplification algorithm with improved error evaluation", Wuhan University Journal of Natural Sciences, vol. 10, Issue 2, Mar. 1, 2005, pp. 380-384

Schroeder et al., "Decimation of trangle meshes", Proceedings of the 19th annual conference on Computer graphics and interactive techniques, SIGGRAPH '92, Jul. 1, 1992, pp. 65-70.

\* cited by examiner

METHOD AND SYSTEM FOR GENERATING A MULTI-DIMENSIONAL SURFACE MODEL OF A GEOMETRIC STRUCTURE

CROSS-REFERENCE TO RELATED APPLICATION

This application is related to U.S. application Ser. No. 13/338,374, filed on Dec. 28, 2011, now pending.

BACKGROUND OF THE INVENTION a. Field of the Invention

This disclosure relates generally to systems and methods for generating a multi-dimensional model of a geometric structure. More particularly, this disclosure relates to a computer-implemented system and method for generating a multi-dimensional model of a geometric structure, such as, for example, an intra-cardiac structure, from a plurality of individual surface models corresponding to different regions of the geometric structure that are joined together to form a single composite surface model.

b. Background Art

It is known that various computer-based systems and computer-implemented methodologies can be used to generate multi-dimensional surface models of geometric structures, such as, for example, anatomic structures. More specifically, a variety of systems and methods have been used to generate multi-dimensional surface models of the heart and/or particular portions thereof.

One conventional methodology or technique involves the generation of a plurality of individual surface models corresponding to different regions of interest of a particular structure, and then joining the individual surface models together to form a single composite multi-dimensional surface model. It is known to generate the individual surface models by collecting location data points from the surfaces of the respective regions of interest and then using those location data points to generate an individual surface model for each region of interest.

Any number of techniques can be used to generate the individual surface models from the respective location data points, including, for example, convex hull, star-shaped domain approximation, and alpha-shape techniques. Once the individual surface models are generated, they are joined together to form a single composite surface model. One known way by which the individual surface models may be joined is by performing a Boolean operation (e.g., using a Boolean Union technique).

Conventional techniques for generating composite surface models from multiple individual surface models generated using collections of location data points are not without their drawbacks, however. For example, composite surface models formed by joining individual surface models generated using collections of location data points may not generate the most accurate representation of the structure of interest. For instance, the individual surface models may not reflect the corresponding region of interest with a desired degree detail or accuracy, or the individual surface models may be less than ideal for multi-dimensional Boolean operations. Either one of these drawbacks may result in a composite surface model that does not reflect the structure of interest with the desired degree of accuracy.

More particularly, while techniques like the convex hull and star shaped domain approximation techniques may provide water-tight surfaces suitable for multi-dimensional Boolean operations, the models produced using these techniques may contain false positive volumes that misrepresent the actual region where the location data points are collected. Therefore, composite surface models comprised of individual surface models generated using these techniques may not have the degree of accurateness or detail that is desired.

Similarly, while techniques like the alpha-shape technique may provide more accurate approximations of the region where location data points are collected as compared to either the convex hull or star-shaped domain approximation, the individual surface models produced using this technique may provide surfaces that are open and non-manifold. As such, the individual surface models generated using this type of technique are less than ideal for multi-dimensional Boolean operations, and require additional processing to account for the non-manifold surfaces in the generation of an acceptable composite surface model.

Thus, composite surface models that are formed, in essence, using collections of location data points, may not provide the desired degree of accuracy and/or may require an undesirable amount of additional processing that increases the complexity of, and the length of time required to perform, the composite surface model generation process.

Accordingly, the inventors herein have recognized a need for a system and method for generating a multi-dimensional model of a geometric structure that will minimize and/or eliminate one or more of the deficiencies in conventional systems.

BRIEF SUMMARY OF THE INVENTION

The present invention is generally directed to systems and methods for generating a multi-dimensional surface model of a geometric structure.

In accordance with one aspect of the invention and the present teachings, a computer-implemented method of constructing a bounding box corresponding to a plurality of location data points is provided. The method comprises acquiring a set of location data points comprising a plurality of sensed location data points. The method further comprises adding, for each sensed location data point, at least one calculated location data point to the set of location data points. In an exemplary embodiment, the adding step comprises adding, for at least one of the sensed location data points, a plurality of calculated location data points to the set of location data points. In such an embodiment, the added calculated location data points may be added along a first axis corresponding to the sensed location data point, or along a plurality of axes corresponding to the sensed location data point. In any event, the method still further comprises defining a three-dimensional bounding box containing each of the sensed and calculated location data points in the set of location data points.

In an exemplary embodiment, the method further comprises expanding the bounding box by a predetermined distance along at least one axis thereof. In an exemplary embodiment, the expanding step comprises expanding the bounding box by a predetermined distance along a plurality of axes thereof. The bounding box may be expanded to render the dimensions thereof integer multiples of the dimensions of a voxel of a voxel grid constructed to correspond to the bounding box.

In accordance another aspect of the invention, a system for constructing a bounding box corresponding to a plurality of location data points is provided. The system comprises a processing apparatus. The processing apparatus is configured to acquire a set of location data points comprising a plurality of sensed location data points. The processing apparatus is further configured to add, for each sensed location data point, at least one calculated location data point to the set of location data points. In an exemplary embodiment, the processing apparatus is configured to add, for at least one of the sensed location data points, a plurality of calculated location data points to the set of location data points. In such an embodiment, the processing apparatus may be configured to add the calculated location data points along a first axis corresponding to the sensed location data point, or along a plurality of axes corresponding to the sensed location data point. In any event, the processing apparatus is still further configured to define a three-dimensional bounding box containing each of the sensed and calculated location data points in the set of location data points.

In an exemplary embodiment, the processing apparatus is further configured to expand the bounding box by a predetermined distance along at least one axis thereof. In an exemplary embodiment, the processing apparatus is configured to expand the bounding box by a predetermined distance along a plurality of axes thereof. The bounding box may be expanded to render the dimensions thereof integer multiples of the dimensions of a voxel of a voxel grid constructed to correspond to the bounding box.

In accordance with another aspect of the invention, a computer-implemented method of identifying voxels in a voxel grid corresponding to a plurality of location data points from which to extract a multi-faceted surface model is provided. The method comprises calculating, for each location data point, a distance between the location data point and each voxel in the voxel grid. The method further comprises creating a first subset of voxels comprising those voxels having a distance from at least one of the location data points that is less than a first predetermined distance. The method still further comprises creating a second subset of voxels comprising those voxels not in the first subset and that neighbor at least one of the voxels in the first subset. The method yet still further comprises computing, for each voxel in the second subset, a distance between the voxel and each voxel in the first subset, and then identifying each voxel in the first subset of voxels that is a distance away from each voxel in the second subset that exceeds a second predetermined distance.

In an exemplary embodiment, the method further comprises acquiring the plurality of location data points, and constructing the voxel grid corresponding to the plurality of location data points. In such an embodiment, the method may further comprise defining a bounding box containing each of the location data points, and wherein the constructing the voxel grid step comprises constructing the voxel grid corresponding to the bounding box.

In accordance with yet another aspect of the invention, a system for identifying voxels in a voxel grid corresponding to a plurality of location data points from which to extract a multi-faceted surface model is provided. The system comprises a processing apparatus. The processing apparatus is configured to calculate, for each location data point, a distance between the location data point and each voxel in the voxel grid. The processing apparatus is further configured to create a first subset of voxels comprising those voxels having a distance from at least one of the location data points that is less than a first predetermined distance. The processing apparatus is still further configured to create a second subset of voxels comprising those voxels not in the first subset and that neighbor at least one of the voxels in the first subset. The processing apparatus is yet still further configured to compute, for each voxel in the second subset, a distance between the voxel and each voxel in the first subset, and to then identify each voxel in the first subset of voxels that is a distance away from each voxel in the second subset that exceeds a second predetermined distance.

In an exemplary embodiment, the processing apparatus is further configured to acquire the plurality of location data points, and to construct the voxel grid corresponding to the plurality of location data points. In such an embodiment, the processing apparatus may be further configured to define a bounding box containing each of the location data points, and to construct the voxel grid corresponding to the bounding box.

The foregoing and other aspects, features, details, utilities, and advantages of the present invention will be apparent from reading the following description and claims, and from reviewing the accompanying drawings.

DETAILED DESCRIPTION OF EMBODIMENTS OF THE INVENTION

Figure 1:
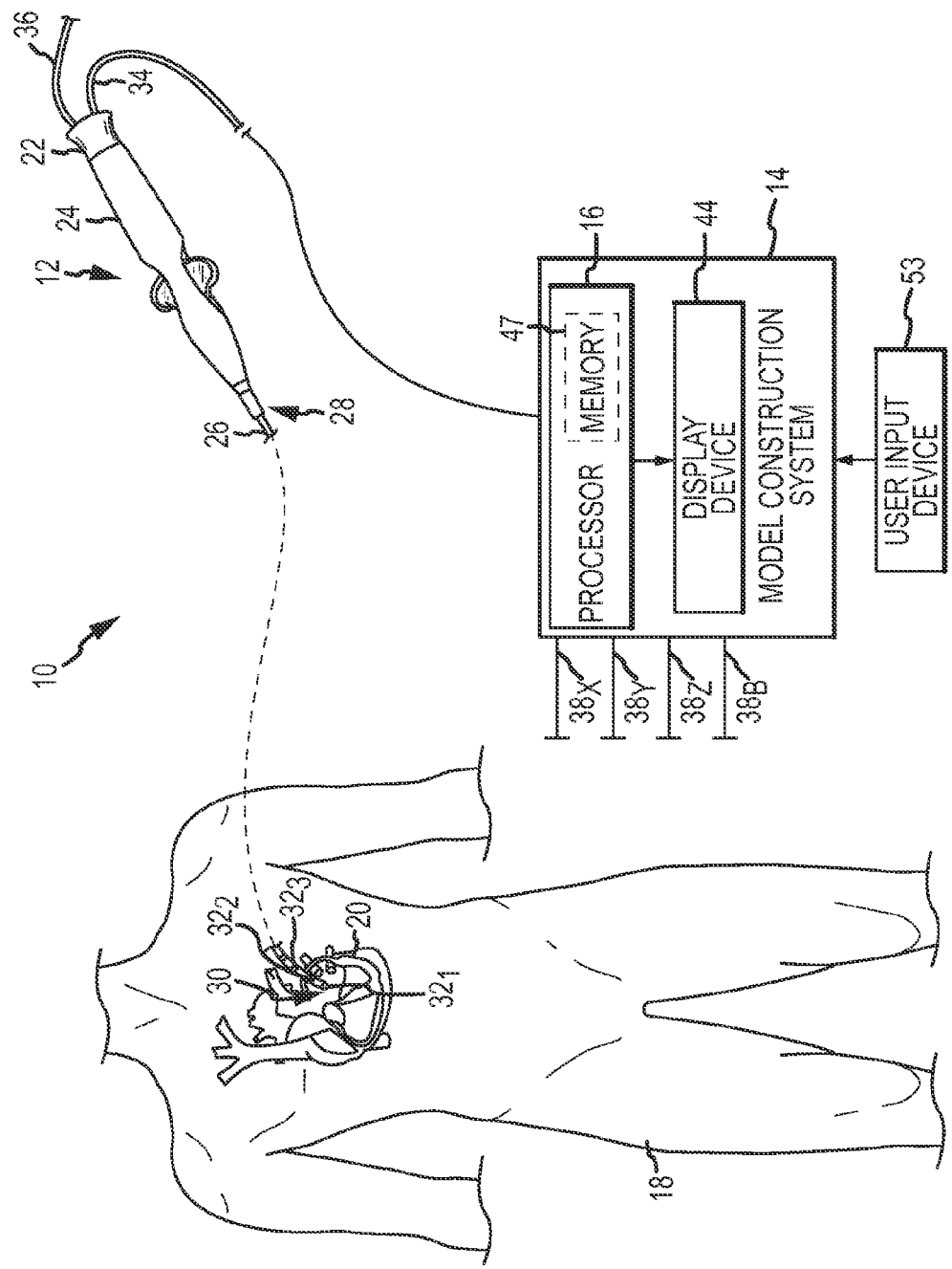
FIG. 1 is a diagrammatic view of a system for generating a multi-dimensional surface model of a geometric structure in accordance with the present teachings.

Referring now to the drawings wherein like reference numerals are used to identify identical components in the various views, FIG. 1 illustrates one exemplary embodiment of a system 10 for generating a multi-dimensional surface model of one or more geometric structures. As will be described below, in an exemplary embodiment the model generated by the system 10 is a three-dimensional model. It will be appreciated, however, that while the description below is generally limited to the generation of a three-dimensional model, the present disclosure is not meant to be so limited. Rather, in other exemplary embodiments, the system 10 may be configured to generate multi-dimensional models other than in three-dimensions, and such embodiments remain within the spirit and scope of the present disclosure.

It should be further noted that while the following description focuses primarily on the use of the system 10 in the generation of models of anatomic structures, and cardiac structures, in particular, the present disclosure is not meant to be so limited. Rather, the system 10, and the methods and techniques used thereby, may be applied to the generation of three-dimensional models of any number of geometric structures, including anatomic structures other than cardiac structures. However, for purposes of illustration and ease of description, the description below will be limited to the use of system 10 in the generation of three-dimensional models of cardiac structures.

With continued reference to FIG. 1, in an exemplary embodiment, the system 10 comprises, among other components, a medical device 12 and a model construction system 14. In an exemplary embodiment, the medical device 12 comprises a catheter (catheter 12), and the model construction system 14 comprises, in part, a processing apparatus 16. The processing apparatus 16 may take the form of an electronic control unit, for example, that is configured to construct a three-dimensional model of structures within the heart using data collected by the catheter 12.

As illustrated in FIG. 1, the catheter 12 is configured to be inserted into a patient's body 18, and more particularly, into the patient's heart 20. The catheter 12 may include a cable connector or interface 22, a handle 24, a shaft 26 having a proximal end 28 and a distal end 30 (as used herein, "proximal" refers to a direction toward the portion of the catheter 12 near the clinician, and "distal" refers to a direction away from the clinician and (generally) inside the body of a patient), and one or more sensors 32 (e.g., $32_1$, $32_2$, $32_3$) mounted in or on the shaft 26 of the catheter 12. In an exemplary embodiment, the sensors 32 are disposed at or near the distal end 30 of the shaft 26. The catheter 12 may further include other conventional components such as, for example and without limitation, a temperature sensor, additional sensors or electrodes, ablation elements (e.g., ablation tip electrodes for delivering RF ablative energy, high intensity focused ultrasound ablation elements, etc.), and corresponding conductors or leads.

The connector 22 provides mechanical, fluid, and electrical connection(s) for cables, such as, for example, cables 34, 36 extending to the model construction system 14 and/or other components of the system 10 (e.g., a visualization, navigation, and/or mapping system (if separate and distinct from the model construction system 14), an ablation generator, irrigation source, etc.). The connector 22 is conventional in the art and is disposed at the proximal end of the catheter 12, and handle 24 thereof, in particular.

The handle 24, which is disposed at the proximal end 28 of the shaft 26, provides a location for the clinician to hold the catheter 12 and may further provide means for steering or guiding the shaft 26 within the body 18 of a patient. For example, the handle 24 may include means to change the length of a steering wire extending through the catheter 12 to the distal end 30 of the shaft 26 to steer the shaft 26. The handle 24 is also conventional in the art and it will be understood that the construction of the handle 24 may vary. In another exemplary embodiment, the catheter 12 may be robotically driven or controlled. Accordingly, rather than a clinician manipulating a handle to steer or guide the catheter 12, and the shaft 26 thereof, in particular, in such an embodiment a robot is used to manipulate the catheter 12.

The shaft 26 is an elongate, tubular, flexible member configured for movement within the body 18. The shaft 26 supports, for example and without limitation, sensors and/or electrodes mounted thereon, such as, for example, the sensors 32, associated conductors, and possibly additional electronics used for signal processing and conditioning. The shaft 26 may also permit transport, delivery, and/or removal of fluids (including irrigation fluids, cryogenic ablation fluids, and bodily fluids), medicines, and/or surgical tools or instruments. The shaft 26 may be made from conventional materials such as polyurethane, and defines one or more lumens configured to house and/or transport electrical conductors, fluids, or surgical tools. The shaft 26 may be introduced into a blood vessel or other structure within the body 18 through a conventional introducer. The shaft 26 may then be steered or guided through the body 18 to a desired location, such as the heart 20, using means well known in the art.

The sensors 32 mounted in or on the shaft 26 of the catheter 12 may be provided for a variety of diagnostic and therapeutic purposes including, for example and without limitation, electrophysiological studies, pacing, cardiac mapping, and ablation. In an exemplary embodiment, one or more of the sensors 32 are provided to perform a location or position sensing function. More particularly, and as will be described in greater detail below, one or more of the sensors 32 are configured to be a positioning sensor(s) that provides information relating to the location (position and orientation) of the catheter 12, and the distal end 30 of the shaft 26 thereof, in particular, at certain points in time. Accordingly, in such an embodiment, as the catheter 12 is moved along a surface of a structure of interest of the heart 20 and/or about the interior of the structure, the sensor(s) 32 can be used to collect location data points that correspond to the surface of, and/or other locations within, the structure of interest. These location data points can then be used by, for example, the model construction system 14, in the construction of a three-dimensional model of the structure of interest, which will be described in greater detail below. For purposes of clarity and illustration, the description below will discuss an embodiment wherein multiple sensors 32 of the catheter 12 comprise positioning sensors. It will be appreciated, however, that in other exemplary embodiments, which remain within the spirit and scope of the present disclosure, the catheter 12 may comprise both one or more positioning sensors as well as other sensors configured to perform other diagnostic and/or therapeutic functions.

As briefly described above, and as will be described in greater detail below, the model construction system 14 is configured to construct a three-dimensional model of structures within the heart using, in part, location data collected by the catheter 12. More particularly, the processing apparatus 16 of the model construction system 14 is configured to acquire location data points collected or sensed by the sensor(s) 32 and to then use those location data points in the construction or generation of a model of the structure(s) to which the location data points correspond. In an exemplary embodiment, the model construction system 14 acquires the location data points by functioning with the sensors 32 to collect location data points. In another exemplary embodiment, however, the model construction system 14 may simply acquire the location data points from the sensors 32 or another component in the system 10, such as, for example, a memory or other storage device that is part of the model construction system 14 or accessible thereby, without affirmatively taking part in the collection of the location data points. In either embodiment, the model construction system 14 is configured to construct a three-dimensional model based on some or all of the collected location data points. For purposes of illustration and clarity, the description below will be limited to an embodiment wherein the model construction system 14 is configured to both construct the model and also acquire location data points by functioning with the sensor(s) 32 in the collection of the location data points. It will be appreciated, however, that embodiments wherein the model construction system 14 only acquires location data points from the sensor(s) 32 or another component of the system 10 and then constructs a three-dimensional model based thereon remain within the spirit and scope of the present disclosure.

Accordingly, in an exemplary embodiment, in addition to constructing a model of a structure, the model construction system 14 is configured to function with the sensor(s) 32 to collect location data points that are used in the construction of a three-dimensional model. In such an embodiment, the model construction system 14 may comprise an electric field-based system, such as, for example, the EnSite NavX™ system commercially available from St. Jude Medical, Inc., and generally shown with reference to U.S. Pat. No. 7,263,397 entitled "Method and Apparatus for Catheter Navigation and Location and Mapping in the Heart", the entire disclosure of which is incorporated herein by reference. In other exemplary embodiments, however, the model construction system 14 may comprise other types of systems, such as, for example and without limitation: a magnetic-field based system such as the Carto™ System available from Biosense Webster, and as generally shown with reference to one or more of U.S. Pat. No. 6,498,944 entitled "Intrabody Measurement," U.S. Pat. No. 6,788,967 entitled "Medical Diagnosis, Treatment and Imaging Systems," and U.S. Pat. No. 6,690,963 entitled "System and Method for Determining the Location and Orientation of an Invasive Medical Instrument," the entire disclosures of which are incorporated herein by reference, or the gMPS system from MediGuide Ltd., and as generally shown with reference to one or more of U.S. Pat. No. 6,233,476 entitled "Medical Positioning System," U.S. Pat. No. 7,197,354 entitled "System for Determining the Position and Orientation of a Catheter," and U.S. Pat. No. 7,386,339 entitled "Medical Imaging and Navigation System," the entire disclosures of which are incorporated herein by reference; a combination electric field-based and magnetic field-based system such as the Carto 3™ System also available from Biosense Webster; as well as other impedance-based localization systems, acoustic or ultrasound-based systems, and commonly available fluoroscopic, computed tomography (CT), and magnetic resonance imaging (MRI)-based systems.

As briefly described above, the sensor(s) 32 of the catheter 12 comprise positioning sensors. The sensor(s) 32 produce signals indicative of catheter location (position and/or orientation) information. In an embodiment wherein the model construction system 14 is an electric field-based system, the sensor(s) 32 may comprise one or more electrodes. Alternatively, in an embodiment wherein the model construction system 14 is a magnetic field-based system, the sensor(s) 32 may comprise one or more magnetic sensors configured to detect one or more characteristics of a low-strength magnetic field. For instance, in one exemplary embodiment, the sensor(s) 32 may comprise magnetic coils disposed on or in the shaft 26 of the catheter 12.

For purposes of clarity and illustration, the model construction system 14 will hereinafter be described as comprising an electric field-based system, such as, for example, the EnSite NavX™ system identified above. It will be appreciated that while the description below is primarily limited to an embodiment wherein the sensor(s) 32 comprise one or more electrodes, in other exemplary embodiments, the sensor(s) 32 may comprise one or more magnetic field sensors (e.g., coils). Accordingly, model construction systems that include positioning sensor(s) other than the sensors or electrodes described below remain within the spirit and scope of the present disclosure.

Figure 2:
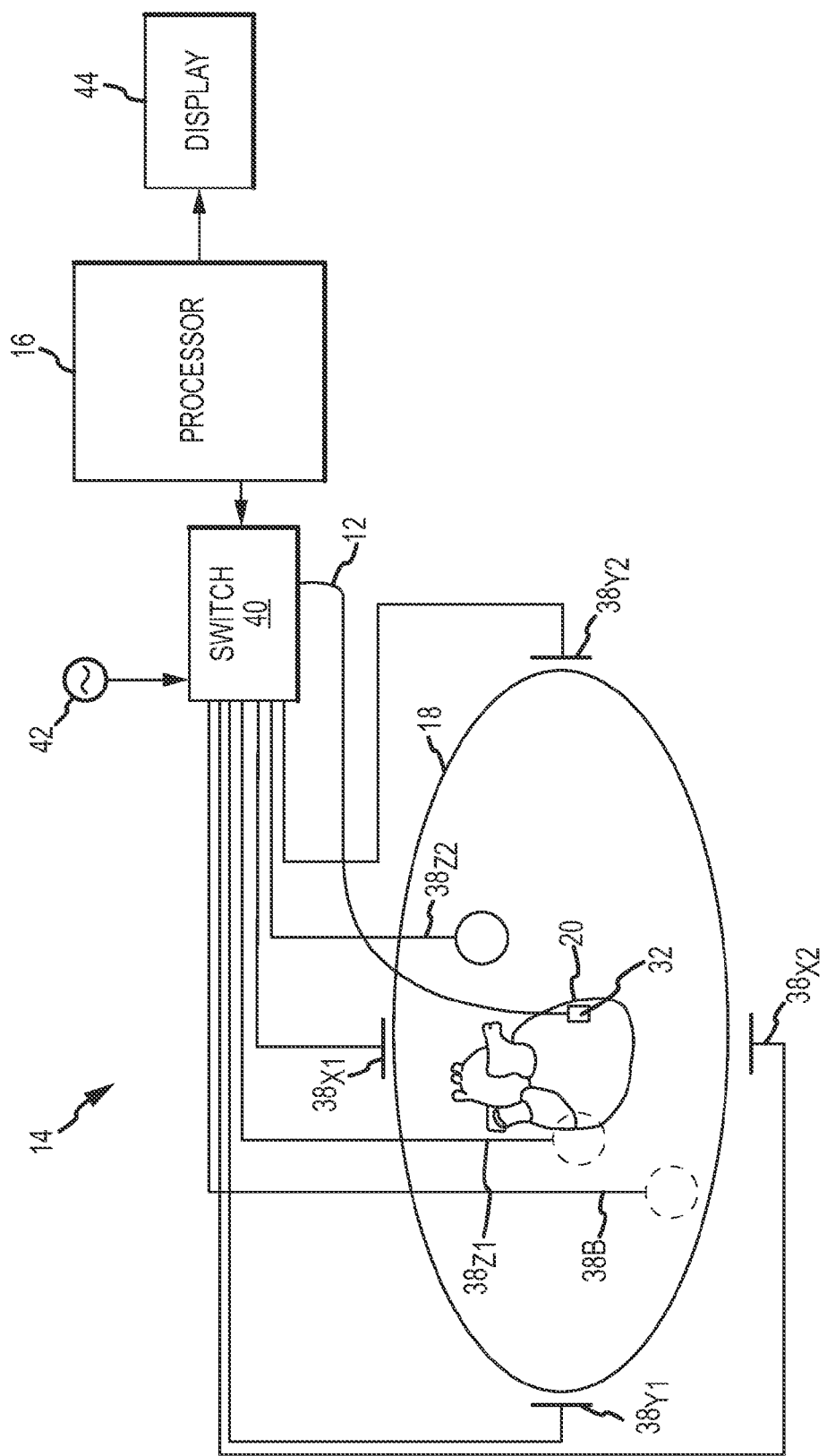
FIG. 2 is a simplified diagrammatic and schematic view of a model construction system of the system illustrated in FIG. 1.

With reference to FIG. 2, in addition to the processing apparatus 16, the model construction system 14 may include, among other possible components, a plurality of patch electrodes 38, a multiplex switch 40, a signal generator 42, and a display device 44. In another exemplary embodiment, some or all of these components are separate and distinct from the model construction system 14 but that are electrically connected to, and configured for communication with, the model construction system 14.

The processing apparatus 16 may comprise a programmable microprocessor or microcontroller, or may comprise an application specific integrated circuit (ASIC). The processing apparatus 16 may include a central processing unit (CPU) and an input/output (I/O) interface through which the processing apparatus 16 may receive a plurality of input signals including, for example, signals generated by patch electrodes 38 and the sensor(s) 32, and generate a plurality of output signals including, for example, those used to control and/or provide data to, for example, the display device 44 and the switch 40. The processing apparatus 16 may be configured to perform various functions, such as those described in greater detail above and below, with appropriate programming instructions or code (i.e., software). Accordingly, the processing apparatus 16 is programmed with one or more computer programs encoded on a computer storage medium for performing the functionality described herein.

With the possible exception of the patch electrode $38_B$ called a "belly patch," the patch electrodes 38 are provided to generate electrical signals used, for example, in determining the position and orientation of the catheter 12. In one embodiment, the patch electrodes 38 are placed orthogonally on the surface of the body 18 and are used to create axes-specific electric fields within the body 18. For instance, in one exemplary embodiment, patch electrodes $38_{X1}$, $38_{X2}$ may be placed along a first (x) axis. Patch electrodes $38_{Y1}$, $38_{Y2}$ may be placed along a second (y) axis, and patch electrodes $38_{Z1}$, $38_{Z2}$ may be placed along a third (z) axis. Each of the patch electrodes 38 may be coupled to the multiplex switch 40. In an exemplary embodiment, the processing apparatus 16 is configured, through appropriate software, to provide control signals to the switch 40 to thereby sequentially couple pairs of electrodes 38 to the signal generator 42. Excitation of each pair of electrodes 38 generates an electric field within body 18 and within an area of interest such as the heart 20. Voltage levels at non-excited electrodes 38, which are referenced to the belly patch $38_B$, are filtered and converted and provided to processing apparatus 16 for use as reference values.

In an exemplary embodiment, the sensor(s) 32 of the catheter 12 are electrically coupled to the processing apparatus 16 and are configured to serve a position sensing function. More particularly, the sensor(s) 32 are placed within electric fields created in the body 18 (e.g., within the heart) by exciting the patch electrodes 38. For purposes of clarity and illustration only, the description below will be limited to an embodiment wherein a single sensor 32 is placed within the electric fields. It will be appreciated, however, that in other exemplary embodiments that remain within the spirit and scope of the present disclosure, a plurality of sensors 32 can be placed within the electric fields and then positions and orientations of each sensor can be determined using the techniques described below.

When disposed within the electric fields, the sensor 32 experiences voltages that are dependent on the location between the patch electrodes 38 and the position of the sensor 32 relative to tissue. Voltage measurement comparisons made between the sensor 32 and the patch electrodes 38 can be used to determine the location of the sensor 32 relative to the tissue. Accordingly, as the catheter 12 is swept about or along a particular area or surface of interest, the processing apparatus 16 receives signals (location information) from the sensor 32 reflecting changes in voltage levels on the sensor 32 and from the non-energized patch electrodes 38. Using various known algorithms, the processing apparatus 16 may then determine the location (position and orientation) of the sensor 32 and record it as a sensed location data point 46 (also referred to herein as "data point 46" and illustrated in FIG. 3) corresponding to a location of the sensor 32, and therefore, a point on the surface of the structure of interest being modeled, in a memory or storage device, such as memory 47, associated with or accessible by the processing apparatus 16. In an exemplary embodiment, prior to recording the location as a location data point, the raw location data represented by the signals received by the processing apparatus 16 may be corrected by the processing apparatus 16 to account for respiration, cardiac activity, and other artifacts using known or hereafter developed techniques. In any event, the collection of location data points 46 ($46_1$, $46_2$, ..., $46_n$) taken over time results in the formation of a point cloud 48 (best shown in FIG. 3) stored in the memory or storage device.

While the description above has thus far been generally with respect to an orthogonal arrangement of the patch electrodes 38, the present disclosure is not meant to be so limited. Rather, in other exemplary embodiments, non-orthogonal arrangements may be used to determine the location coordinates of the sensor 32. For example, and in general terms, FIGS. 4A-4D depict a plurality of exemplary non-orthogonal dipoles $D_0$, $D_1$, $D_2$, and $D_3$, set in a coordinate system 50. In FIGS. 4A-4D, the X-axis patch electrodes are designated $X_A$ and $X_B$, the Y-axis patch electrodes are designated $Y_A$ and $Y_B$, and the Z-axis patch electrodes are designated $Z_A$ and $Z_B$. For any desired axis, the potentials measured across an intracardiac sensor, such as sensor 32, resulting from a predetermined set of drive (source sink) configurations may be combined algebraically to yield the same effective potential as would be obtained simply by driving a uniform current along the orthogonal axes. Any two of the patch electrodes $38_{X1}$, $38_{X2}$, $38_{Y1}$, $38_{Y2}$, $38_{Z1}$, and $38_{Z2}$ (See FIG. 2) may be selected as a dipole source and drain with respect to a ground reference, e.g., the belly patch $38_B$, while the unexcited patch electrodes measure voltage with respect to the ground reference. The sensor 32 placed in the heart 20 is also exposed to the field for a current pulse and is measured with respect to ground, e.g., the belly patch $38_B$.

In another exemplary embodiment, multiple patch electrodes 38 may be arranged linearly along a common axis. In such an embodiment, excitation of an electrode pair comprising one of the patch electrodes 38 and an electrode mounted on the catheter results generates an electric field. The non-excited patch electrodes 38 may then measure potentials that can be used to determine the position of the sensor 32. Accordingly, in an embodiment, the excitation of multiple electrode pairs comprising different patch electrodes 38 and the catheter-mounted electrode may used to determine the position of the sensor 32.

Data sets from each of the patch electrodes 38 and the sensor 32 are all used to determine the location of the sensor 32 within the heart 20. After the voltage measurements are made, a different pair of patch electrodes is excited by the current source and the voltage measurement process of the remaining patch electrodes and internal sensor takes place. Once the location of the sensor 32 is determined, and as was described above, the location may be recorded as a data point 46 in the same manner described above. In an exemplary embodiment, prior to recording the location as a location data point, the raw location data represented by the signals received by the processing apparatus 16 may be corrected by the processing apparatus 16 to account for respiration, cardiac activity, and other artifacts using known or hereafter developed techniques. Accordingly, it will be appreciated that any number of techniques may be used to determine locations of the sensor 32 and to, therefore, collect data points corresponding thereto, each of which remains within the spirit and scope of the present disclosure.

Figure 3:
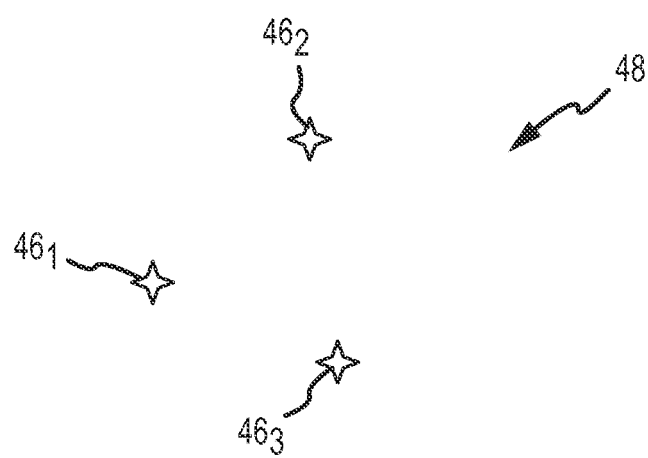
FIG. 3 is a schematic view of a point cloud containing a collection of location data points.
Figure 4A:
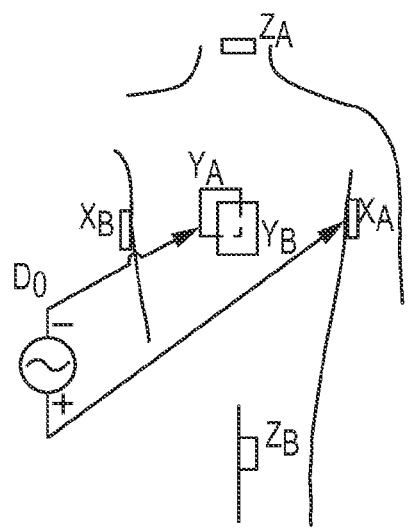
FIGS. 4A-4D are schematic diagrams of exemplary dipole pairs of driven patch electrodes suitable for use in the model construction system illustrated in FIG. 2.
Figure 4B:
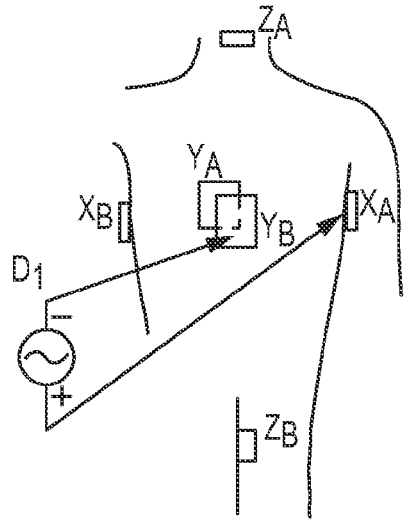
Figure 4C:
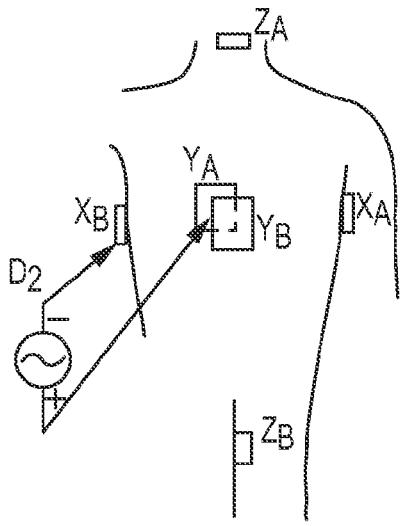
Figure 4D:
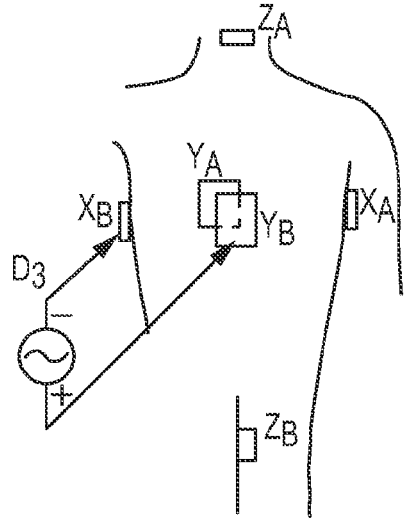

FIG. 3 is illustrative of the point cloud 48 comprising location data points $46_1$-$46_3$ corresponding to a particular structure of interest being modeled. It will be appreciated that while point cloud 48 illustrated in FIG. 3 only comprises three location data points 46, in practice the point cloud 48 would generally include hundreds to hundreds of thousands of data points 46. For purposes of illustration and ease of description, however, the description below will be limited to a point cloud having a limited number of location data points, such as, for example, the point cloud 48 comprised of three location data points 46. It will be further appreciated that location data points 46 corresponding to different regions of the structure of interest may be collected. In such an embodiment, the processing apparatus 16 may be configured to group data points 46 corresponding to the region of the structure of interest from which they were collected. As such, if there are two regions of the structure of interest, all of the location data points corresponding to a first region will be grouped together and form a first point cloud, while all of the data points corresponding to a second region will be likewise grouped together and form a second point cloud.

Figure 5:
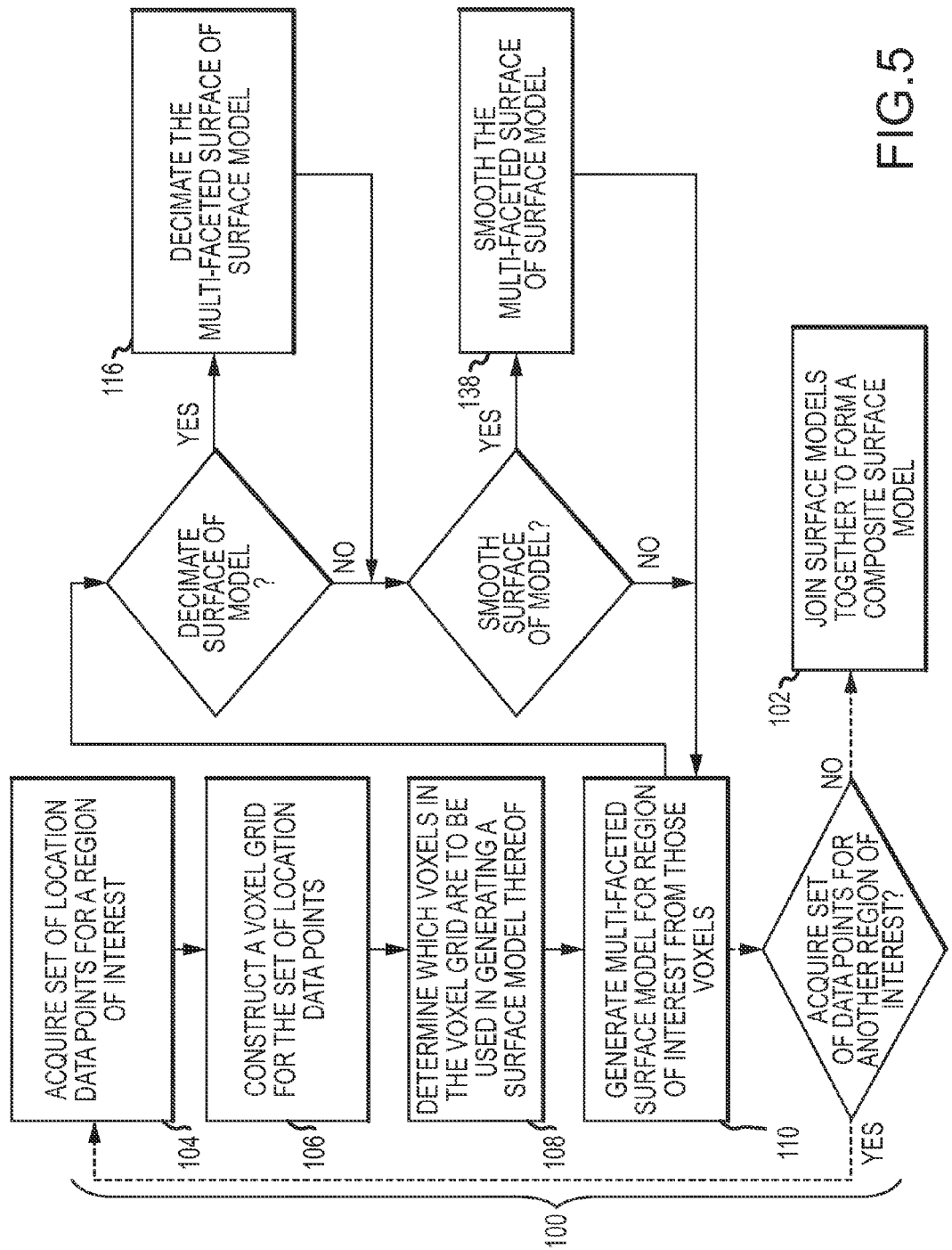
FIG. 5 is a flow chart illustrating an exemplary embodiment of a method of generating a multi-dimensional surface model of a geometric structure in accordance with the present teachings.

In one exemplary embodiment, and with reference to FIG. 5, the processing apparatus 16 is configured, in general terms, to first generate one or more surface models of one or more individual regions of an anatomic structure of interest (Step 100). In an exemplary embodiment wherein more two or more surface models of two more individual regions of interest are generated, the processing apparatus 16 may be further configured to join the plurality of individual surface models together to form a composite surface model of the structure of interest (Step 102). For purposes of clarity and illustration, the embodiment wherein multiple surface models of multiple regions of interest are generated and then joined will be hereinafter described with respect to the generation of a three-dimensional composite surface model representative of two regions of the anatomic structure of interest. As such, the composite surface model will be comprised of two joined-together surface models, each corresponding to a respective one of the two different regions of the structure of interest. It will be appreciated, however, that the present disclosure is not limited to an embodiment wherein the processing apparatus 16 generates a composite surface model comprised of two joined-together surface models. Rather, those of ordinary skill in the art will appreciate that the processing apparatus 16 may be configured to generate a composite surface model comprised of three or more individual surface models that are joined together using the techniques described below, and therefore, a processing apparatus having this capability remains within the spirit and scope of the present disclosure.

A surface model (or each surface model used to generate a composite surface model) may be generated in a number of ways. In an exemplary embodiment such as that illustrated in FIG. 5, and in general terms, the processing apparatus 16 is configured to initially acquire a first set of location data points 46 corresponding to the first region of interest. The processing apparatus may also gather a second set of location data points 46 corresponding to a second region of interest. As was described above, each location data point 46 in the first set of location data points corresponds to a respective location on the surface of the first region of the anatomic structure of interest, while each data point 46 in the second set of location data points corresponds to a respective location on the surface of the second region of the anatomic structure of interest.

As described elsewhere herein, the processing apparatus 16 is configured to acquire the location data points in a number of ways. In an exemplary embodiment, the processing apparatus 16 acquires the location data points from the sensor 32, which collects the location data points from the surface of the structure. In another exemplary embodiment, the processing apparatus 16 acquires the sets of location data points by obtaining them from a memory or storage device that is part of or electrically connected to, and configured for communication with, the processing apparatus 16. Accordingly, the processing apparatus 16 may acquire the sets of location data points (and the location data points thereof) from one of any number of sources, each of which remain within the spirit and scope of the present disclosure. Using the respective sets of location data points 46, the processing apparatus 16 is configured to generate surface models of each region of interest.

Once one or more sets of location data points 46 are acquired, the processing apparatus 16 is configured to generate one or more individual surface models of each region of interest based on the location data points 46 in the respective sets of location data points 46. To do so, and in general terms, the processing apparatus 16 is configured to calculate or construct a respective voxel field or grid for each of the first and second sets of location data points 46 (Step 106). Each voxel grid contains all of the location data points 46 of the set of location data points to which that voxel grid corresponds and each voxel grid comprises a plurality of voxels.

Once voxel grids for each set of location data points 46 are constructed, the processing apparatus 16 is configured to determine or identify which voxels in the respective voxel grids are to be used in the generation of the individual surface models (Step 108). The processing apparatus 16 then uses those identified voxels to generate the surface models using one of any number of triangulated surface reconstruction techniques known in the art, such as, for example and without limitation, an alpha-hull technique or algorithm (Step 110).

While the description of the generation of individual surface models has thus far been in general terms, an exemplary embodiment of a process for generating the individual surface models will now be described in greater detail. In this exemplary embodiment, the individual surface models are generated using the particular alpha-hull technique or algorithm that is described herein below. It will be appreciated, however, that in other exemplary embodiments, different techniques, or a combination of techniques may be used to generate voxel-based surface models. One such exemplary technique is the Marching Cubes technique or algorithm. Another such exemplary technique is that described in U.S. Pat. No. 8,000,941 issued on Aug. 16, 2011 and entitled "System and Method for Surface Reconstruction from an Unstructured Point Set," the entire disclosure of which is incorporated herein by reference. Accordingly, embodiments wherein voxel-based surface models are generated using techniques other than that specifically described in detail herein remain within the spirit and scope of the present disclosure.

Further, and also for purposes of illustration, clarity, and ease of description, the description below will be limited to only the generation of a surface model corresponding to a single region of interest of the anatomic structure (e.g., the first region of interest). It will be appreciated, however, that the techniques described with respect to the generation of the surface model of the first region of interest may also be implemented by the processing apparatus 16 to generate a surface model of the second region of interest, or any other regions of interest of the anatomic structure of interest. Accordingly, the surface model of the second region of interest (and any other regions of interest) may be generated using the same techniques described below.

Figure 6:
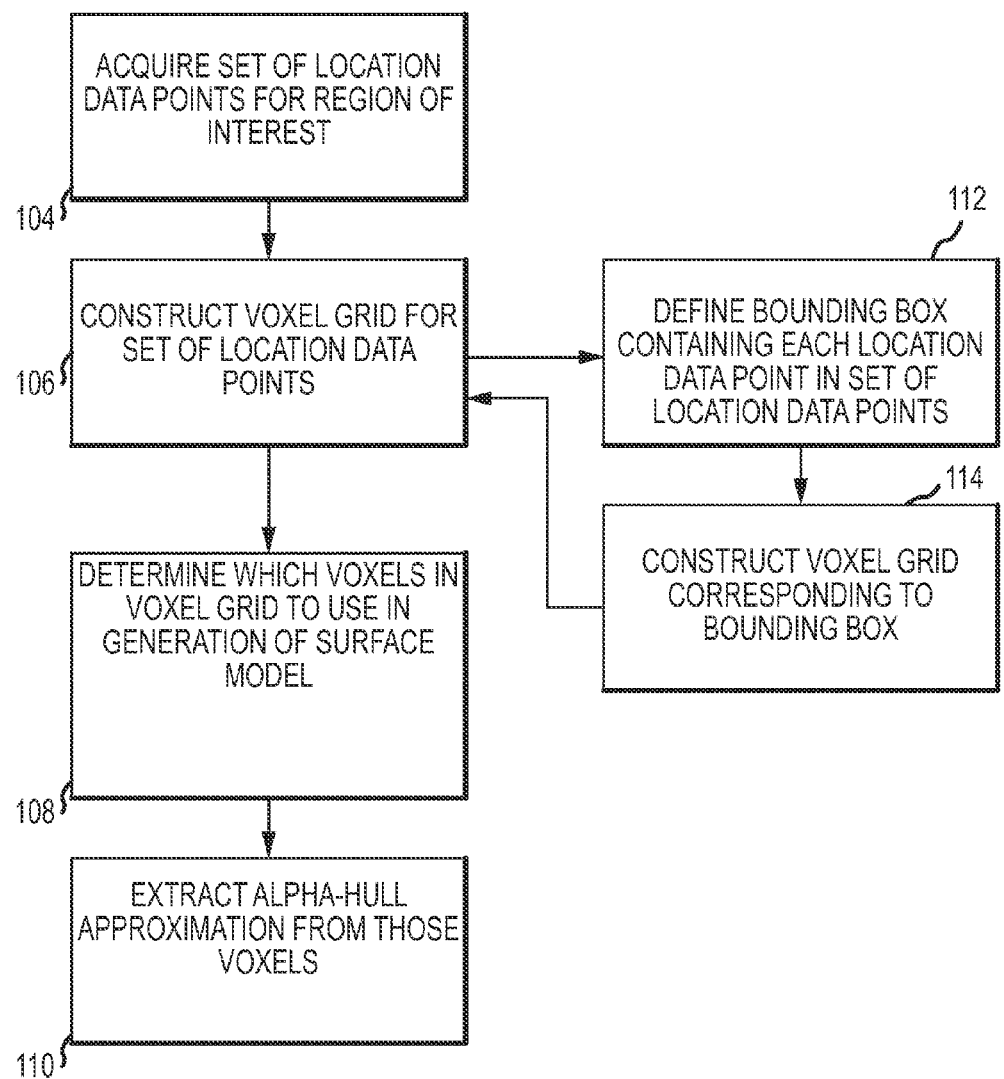
FIG. 6 is a flow chart illustrating an exemplary embodiment of a method of calculating or computing an alpha-hull approximation from a plurality of voxels in a voxel grid.
Figure 7:
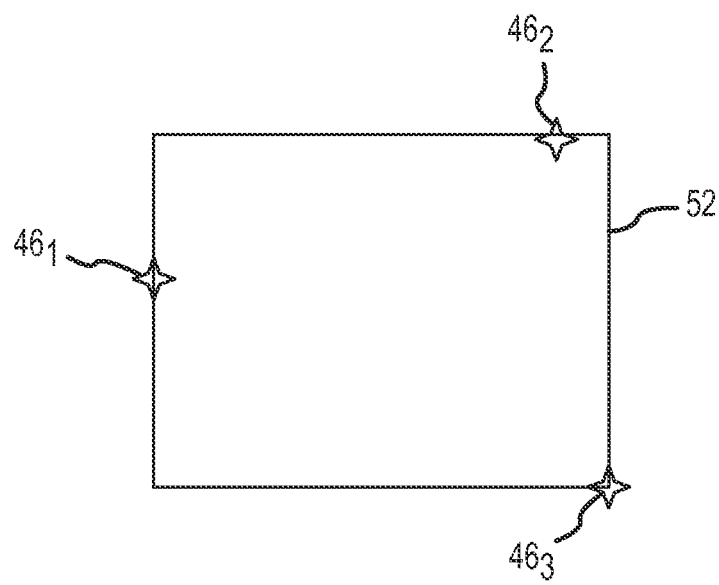
FIG. 7 is a schematic view of a bounding box containing the location data points of the point cloud illustrated in FIG. 3.

Accordingly, with reference to FIG. 6 and as was described above, in an exemplary embodiment, the processing apparatus 16 is configured to acquire the set of data points 46 corresponding to the region of interest (Step 104). The processing apparatus 16 may be configured to acquire the data points 46 from any number of sources, such as, for example and without limitation, a memory or other storage medium associated with or accessible by the processing apparatus 16, such as, for example, the memory 47, or from any other source in the system 10 or model construction system 14 (e.g., the sensor 32). As was also described above, the processing apparatus 16 is configured to calculate or construct a voxel grid for the acquired set of location data points (Step 106). In the exemplary embodiment illustrated in FIG. 6, to construct the voxel grid, the processing apparatus 16 is configured to first define a bounding box or volume 52 that comprises each of the data points 46 of the set of location data points (Step 112). For example, FIG. 7 illustrates the bounding box 52 corresponding to the data points $46_1$-$46_3$ illustrated in FIG. 3.

Once the bounding box 52 is defined, the Euclidean coordinates of the bounding box 52 are determined. More particularly, the minimum and maximum values along each of the x-, y-, and z-axes are determined and used as the coordinates of the bounding box 52. Accordingly, to determine the x-coordinates of the bounding box 52, the processing apparatus 16 is configured to determine the location data point 46 that has the minimum "x value" of all the data points 46 in the set of data points, and the location data point 46 that has the maximum "x value" of all the data points 46 in the set of data points. The processing apparatus 16 then uses those respective minimum and maximum values as the minimum and maximum x-coordinates of the bounding box 52. The minimum and maximum y- and z-coordinates of the bounding box 52 are determined in the same manner described above with respect to the x-coordinates.

Once the coordinates of the bounding box 52 are determined (i.e., (MIN$_x$, MIN$_y$, MIN$_z$) and (MAX$_x$, MAX$_y$, MAX$_z$)), in an exemplary embodiment, the bounding box 52 is padded by expanding the bounding box 52 by a predetermined distance alpha ($\alpha$) in the x-, y-, and z-directions, and the coordinates of the expanded bounding box 52 (i.e., (min$_x$, min$_y$, min$_z$) and (max$_x$, max$_y$, max$_z$)) are determined. The coordinates of the expanded bounding box 52 may be determined using the equations (1)-(6) below:

$$\min{}_x = MIN_x - \alpha; \tag{1}$$

$$\min{}_y = MIN_y - \alpha; \tag{2}$$

$$\min{}_z = MIN_z - \alpha; \tag{3}$$

$$\max{}_x = MAX_x + \alpha; \tag{4}$$

$$\max{}_y = MAX_y + \alpha; \tag{5}$$

and $$\max{}_x = MAX_z + \alpha. \tag{6}$$

In an exemplary embodiment, the value of $\alpha$ is a measure of distance on the order of millimeters that may be set as part of the set-up of the system 10, and the processing apparatus 16, in particular (i.e., during manufacture of the system 10 or during the initialization of the system 10 and prior to use). In another embodiment, $\alpha$ may be defined by the size of the medical device, e.g. $\alpha$ may be the radius or diameter of the catheter 12, sensor 32, or a fraction or multiple thereof. Further, the value may be non-adjustable or it may be adjustable by the user of the system 10 using, for example, a user interface 53 (best shown in FIG. 1), such as, for example, a touch screen, a keyboard, a keypad, a slider control, a graphical user interface having one or more user-selectable or user-inputtable fields, or some other user-controllable input device electrically connected to the processing apparatus 16 to allow the user to set or adjust the $\alpha$ value.

Figure 19:
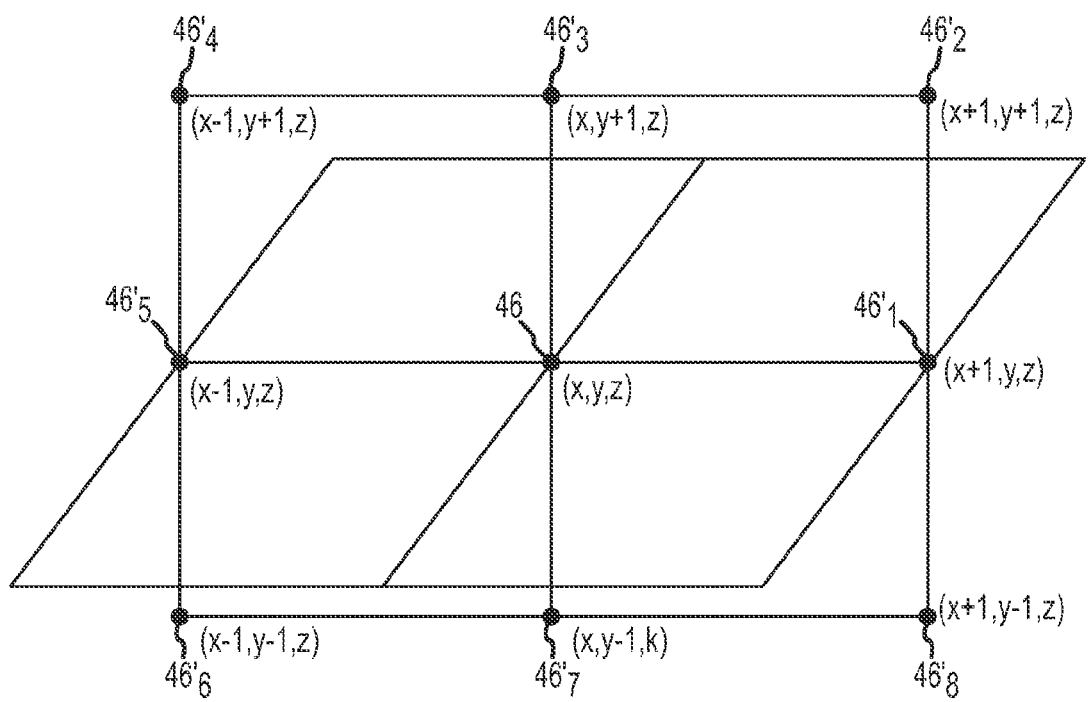
FIG. 19 is a schematic view illustrating the creation of new calculated location data points based on a given collected or sensed location data point.

In another embodiment, $\alpha$, or some other predetermined value, can be added to each location data point 46 to create one or more new or additional location data points 46'. More particularly, for each location data point 46, the processing apparatus 16 may be configured to calculate a location for one or more additional location data points 46' based on the location of the location data point 46, and to then add one or more location data points 46' at that or those calculated locations. The location data points 46' added in this manner may be referred to as "calculated" location data points 46' so as to distinguish them from those location data points 46 collected by the sensor 32, which are "sensed" location data points. For instance, and with reference to FIG. 19, with $\alpha$ set as (1), for example, eight (8) new "calculated" location data points 46' can be created from the sensed point at location (x, y, z) on one axis, the points being points 46'$_1$-46'$_8$ (i.e., (x+1, y, z), (x+1, y+1, z), (x, y+1, z), (x-1, y+1, z), (x-1, y, z), (x-1, y-1, z), (x, y-1, z), and (x+1, y-1, z)) Likewise, eight (8) new or calculated data points can be created with some overlap in points on each of the other axes, or the following twenty-six (26) total new points 46' can be created:

(x-1, y-1, z), (x, y-1, z-1), (x+1, y-1, z-1),
(x-1, y, z-1), (x, y, z-1), (x+1, y, z-1),
(x-1, y+1, z-1), (x, y+1, z-1), (x+1, y-1, z-1),
(x-1, y-1, z), (x, y-1, z), (x+1, y-1, z),
(x-1, y, z), (x+1, y, z),
(x-1, y+1, z), (x, y+1, z), (x+1, y+1, z),
(x-1, y-1, z+1), (x, y-1, z+1), (x+1, y-1, z+1),
(x-1, y, z+1), (x, y, z+1), (x+1, y, z+1),
(x-1, y+1, z+1), (x, y+1, z+1), (x+1, y+1, z+1).

These calculated location data points 46' may then be used along with the location data points 46 (i.e., sensed location data points 46) to define the bounding box 52 with or without the formulae above.

In certain instances, following the determination of the (min) and (max) coordinates, further padding of the bounding box 52 may be necessary. More particularly, in an exemplary embodiment, it may be required that the dimensions of the bounding box 52 in each direction be integer multiples of the dimensions of the voxels that will comprise the voxel grid. However, if after padding the bounding box 52 by the $\alpha$ value the dimensions thereof are not integer multiples of the voxel dimensions (e.g., because the $\alpha$ value itself is not an integer multiple of the voxel dimensions), further padding of the bounding box 52 is necessary to meet this requirement. For example, assume the dimensions of the voxels are 1×1×1 (in millimeters), and that the dimensions of the bounding box 52 following the padding by the $\alpha$ value are 128.4×1296.0× 417.9 (also in millimeters). In this instance, the processing apparatus 16 will pad the bounding box 52 by expanding the dimensions to the next voxel boundary in each direction, such that the padded dimensions in this example would be 129× 1296×418. Thus, the bounding box dimensions would be integer multiples of the voxel dimensions on each side or in each direction. In such an instance, some or all of the (min) and (max) coordinates would need to be adjusted in accordance with the magnitude of the further padding of the bounding box.

Figure 8:
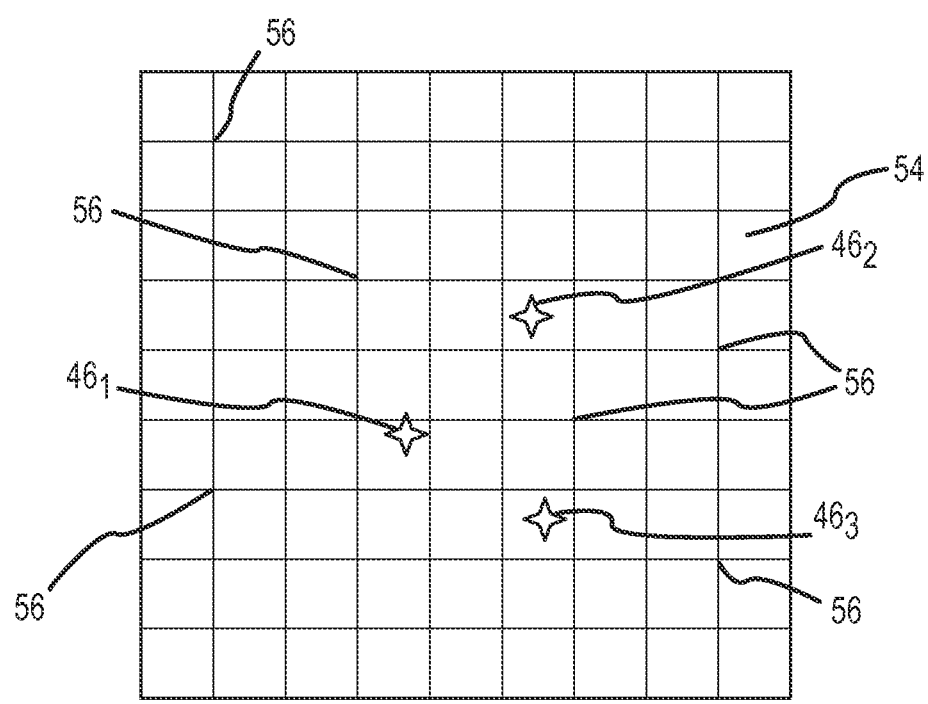
FIG. 8 is a schematic view of a voxel grid containing all of the location data points of the point cloud illustrated in FIG. 3.

With reference to FIGS. 6 and 8, following the padding or expansion of the bounding box 52 and the determination of the coordinates of the expanded bounding box 52, the processing apparatus 16 is configured to construct, as illustrated in FIG. 8, a voxel grid 54 within the bounding box 52 (Step 114). The voxel grid 54 has a predetermined value of "v", which corresponds to the distance between each voxel 56 in the voxel grid 54 (each point at which the horizontal and vertical grid lines intersect in FIG. 8 constitutes a voxel 56). As with the $\alpha$ value described above, the value of v may be set as part of the set-up of the system 10, and the processing apparatus 16, in particular (i.e., during manufacture of the system 10 or during the initialization of the system 10 and prior to use). Further, the value may be non-adjustable or it may be adjustable by the user of the system 10 using, for example, the user interface 53 described above. In an exemplary embodiment, the value of v is on the order of 0.75 mm, however, the present disclosure is not meant to be so limited.

The voxel grid 54 has dimensions given by I cells in the x-direction, J cells in the y-direction, and K cells in the z-direction. The actual values of I, J, and K are calculated using the equations (7)-(9):

$$I = \frac{(\max_x - \min_x)}{v}; \tag{7}$$

$$J = \frac{(\max_y - \min_y)}{v}; \text{ and} \tag{8}$$

$$K = \frac{(\max_z - \min_z)}{v}. \tag{9}$$

Each voxel 56 in the voxel grid 54 will be identified by an index (i, j, k) in the grid, and the coordinates of each voxel 56 will be (min$_x$+iv, min$_y$+jv, min$_z$+kv).

As briefly described above, once the voxel grid 54 is constructed, the processing apparatus 16 is configured to determine which voxels 56 of the grid 54 are to be used in the generation of the surface model of the region of interest (Step 108). In an exemplary embodiment, this is done by identifying those voxels 56 that are considered to be, as will be described in greater detail below, "interior voxels." An exemplary technique for identifying "interior voxels" will now be described.

Figure 9:
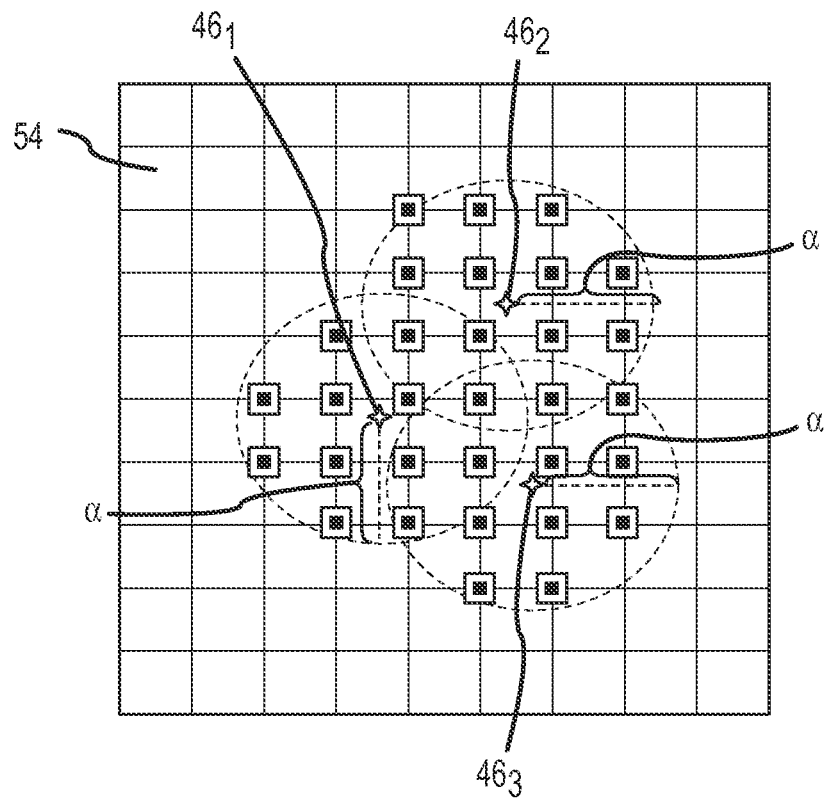
FIG. 9 is a schematic view of the voxel grid illustrated in FIG. 8 and depicting those voxels of the voxel grid that are within a predetermined distance of at least one of the location data points of the point cloud illustrated in FIG. 3.

In an exemplary embodiment, the processing apparatus 16 is configured to perform a dilation process on the set of location data points 46 being evaluated. More particularly, for each location data point 46 in the set of data points being evaluated, the processing apparatus 16 is configured to calculate the distance "d" between the data point 46 and each of the voxels 56 in the grid. In an exemplary embodiment, the distance "d" can be calculated using equation (10):

$$d = \sqrt{[(x_n - (\min_x + iv))^2 + (y_n - (\min_y + jv))^2 + (z_n - (\min_z + kv))^2]} \quad (10)$$

wherein "n" corresponds to the number of the location data point 46 (e.g., $46_1$, $46_2$, ..., $46_n$) being evaluated. For each voxel 56 for which the distance between it and one of the data points 46 is less than the predetermined value of α (briefly described above with respect to the expansion of the bounding box 52), the voxel 56 is marked as an "interior voxel." Accordingly, each data point 46 in the bounding box 52 is evaluated to determine which subset of voxels 56 are within a distance α from at least one of the data points 46, and therefore, are to be considered interior voxels. For example, each voxel 56 represented by a box in FIG. 9 has been determined by the processing apparatus 16 to be within the predetermined distance α from at least one of the data points 46, and therefore, is determined to be an interior voxel (voxel $56_I$). All other voxels 56 not determined to be interior voxels are considered to be, and are identified as, "exterior voxels."

Figure 10:
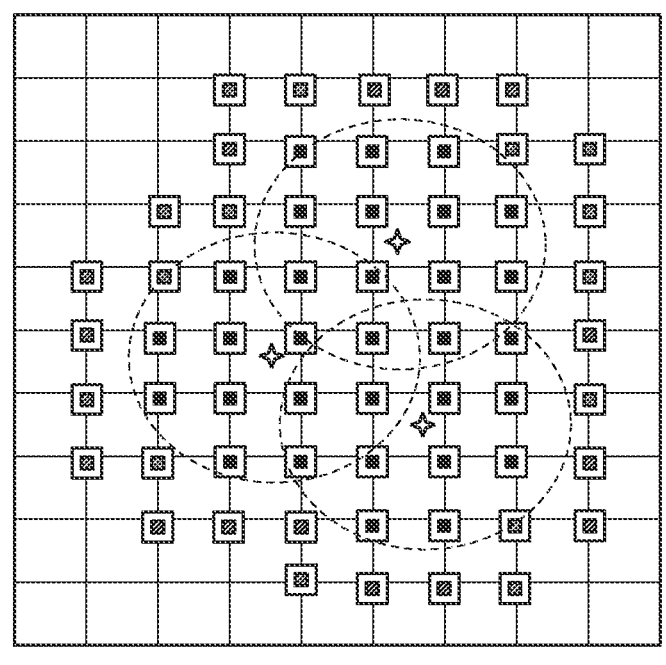
FIG. 10 is a schematic view of the voxel grid illustrated in FIG. 8 and depicting those voxels illustrated in FIG. 9 that are within a predetermined distance of at least one of the location data points of the point cloud illustrated in FIG. 3, as well as those voxels of the voxel grid that are adjacent to the voxels depicted in FIG. 9.

Once it is determined which of the voxels 56 are interior voxels, in an exemplary embodiment, the processing apparatus 16 is configured to conduct an erosion process on the subset of voxels comprised of the interior voxels $56_I$ and certain of the exterior voxels. More particularly, the processing apparatus 16 is configured to construct a set of indices that comprises the index of each voxel 56 identified as an exterior voxel, but that neighbors an interior voxel $56_I$. For example, each voxel 56 identified as voxel $56_E$ in FIG. 10 has been determined to be an exterior voxel that also neighbors an interior voxel $56_I$. For each voxel $56_E$ the processing apparatus 16 is configured to calculate the distance between the voxel $56_E$ and each of the voxels $56_I$. Based on the calculated distances, the processing apparatus 16 is configured to determine a subset of voxels $56_I$ that have a distance to one or more of voxels $56_E$ that is less than the distance "dist." represented by equation (11):

$$dist. = \alpha - \frac{v}{2} \quad (11)$$

Figure 11:
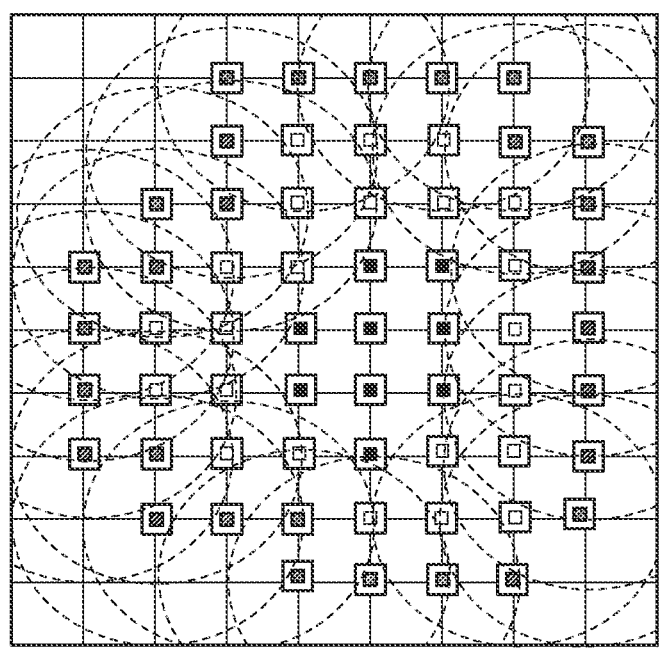
FIG. 11 is a schematic view of the voxel grid illustrated in FIG. 8 and depicting the voxels illustrated in FIG. 10, with the voxels deemed to be interior voxels used for the generation of a corresponding surface model being differentiated from the other voxels in the voxel grid.

For each voxel $56_I$ determined to be within the distance dist. from one or more of voxels $56_E$, the identification of that voxel is changed from "interior voxel" to "exterior voxel," and thus, as illustrated in FIG. 11, the representation of those voxels changes from "voxel $56_I$" to voxel "$56_{IE}$" (the designation "$56_{IE}$" is meant to differentiate those exterior voxels previously considered to be interior voxels from those exterior voxels that have always been considered to be exterior voxels).

Following the erosion process described above, the processing apparatus 16 is configured to process the voxels $56_I$ (i.e., the interior voxels) to generate a surface model based on the voxels $56_I$. In an exemplary embodiment, this comprises calculating/computing or extracting the alpha-hull approximation from the interior voxels $56_I$ (Step 110). As described above, it will be appreciated that while for purposes of illustration and clarity only the alpha-hull technique is described in detail herein with respect to generating the surface model from the voxels $56_I$, in other exemplary embodiments techniques or algorithms other than the alpha-hull technique may be used. For example, and as briefly described above, in another exemplary embodiment, the Marching Cubes technique or algorithm can be employed to generate the surface model. Thus, embodiments wherein techniques other than the alpha-hull technique are used in the surface model generating process remain within the spirit and scope of present disclosure.

Figure 12:
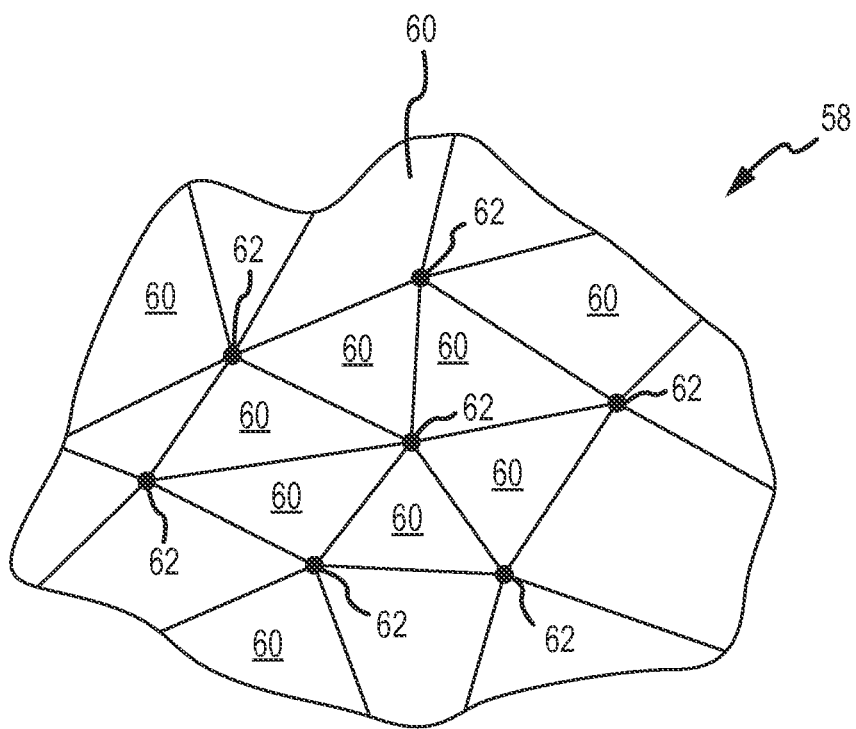
FIG. 12 is a schematic view of a portion of a multi-faceted surface of an exemplary surface model.

In an embodiment wherein the alpha-hull technique is employed, the extraction described above results in a surface model in the form of an alpha-hull approximation (surface model or alpha-hull approximation 58) having a multi-faceted surface (e.g., containing a plurality of facets 60 and vertices 62), which, in an exemplary embodiment, comprises a triangulated surface. In the resulting surface model or alpha-hull approximation 58, each of the voxels $56_I$ would correspond to a vertex 62 of the multi-faceted surface of the alpha-hull approximation 58. For purposes of illustration, FIG. 12 depicts a portion of a multi-faceted surface of an exemplary alpha-hull approximation 58. It should be noted that because the interior voxels $56_I$ illustrated in FIG. 11 are shown in two-dimensions, the alpha-hull approximation illustrated in FIG. 12 does not necessarily correspond to the interior voxels $56_I$, but rather is an exemplary alpha-hull approximation provided simply for illustrative purposes only to show the vertices 62 and facets 60 of the multi-faceted surface thereof.

With reference to FIG. 5, once the surface model 58 having a multi-faceted surface is generated, whether by performing the alpha-hull approximation technique described above or otherwise, in an exemplary embodiment, the processing apparatus 16 is configured to decimate excess facets 60 from the multi-faceted surface thereof (Step 116) to reduce the number of facets 60 and vertices 62 in the multi-faceted surface. More particularly, in an embodiment wherein the surface of the surface model 58 is to be decimated, the processing apparatus 16 is configured to execute a decimation algorithm that reduces the number of facets 60 and vertices 62 while maintaining the accuracy of the representation. In an exemplary embodiment, this is accomplished by consolidating vertices 62 that have the least effect on larger-scale features of the multi-faceted surface. In general terms, the reduction in the number of facets 60 is accomplished through the evaluation of the vertices 62 and the operation of edge collapse, a technique well known in the art, based on the evaluation of the vertices 62. The vertices 62, which are derived from the interior voxels $56_I$, are selected in a greedy-algorithm fashion based on factors such as, for example, topological and geometric criteria, and then evaluated as described herein.

Figure 13A:
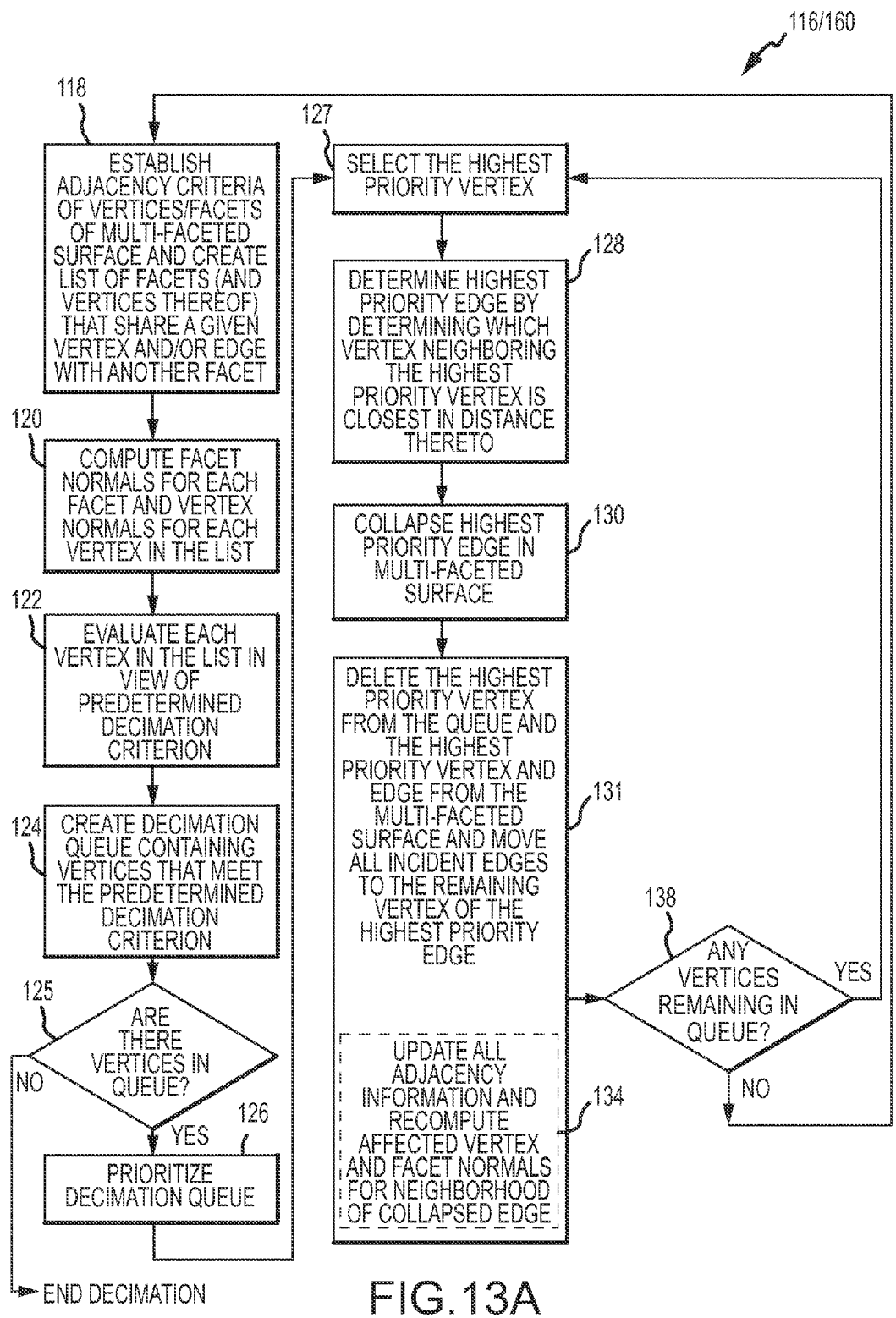
FIGS. 13A and 13B are flow charts illustrating exemplary techniques for decimating a multi-faceted surface of a surface model.

With reference to FIG. 13A, an exemplary decimation algorithm that may be executed by the processing apparatus 16 will now be described. As an initial matter, the processing apparatus 16 is configured to establish the basic adjacency of the facets 60/vertices 62 of the multi-faceted surface (Step 118). To do so, the processing apparatus 16 tabulates those facets 60 that share a given vertex 62 and/or facet edge 64 (as illustrated in FIG. 12, each facet 60 comprises a plurality of edges 64) with another facet 60. Accordingly, each facet 60 that shares a given vertex 62 and/or edge 64 with another facet 60 is placed into a list for future processing or evaluation.

Once the appropriate facets 60 are placed in the list, in an exemplary embodiment, the processing apparatus 16 is configured to compute facet normals for each facet 60 and vertex normals for each vertex 62 in the list (Step 120). A facet normal is a vector of unit length perpendicular to the plane of the facet 60, and directed outward from the volume enclosed by the surface of which the facet 60 is a part. A vertex normal is a weighted average of the facet normals of the facets 60 immediately adjacent the vertex 62 being evaluated. The weight factor is related to the corresponding areas of the facets 60 such that larger facets 60 contribute proportionally more to the vertex normal than do smaller neighboring facets 60. The facet and vertex normals may be computed using techniques that are well known in the art, and therefore, the techniques for computing facet and vertex normals will not be described.

Once the vertex and facet normals are computed for each facet 60 and vertex 62 in the list, respectively, the processing apparatus 16 is configured to evaluate each vertex 62 in the list with respect to certain decimation criterion (Step 122), and to then create a decimation queue based on that evaluation (Step 124). In general terms, the decimation criterion requires that the neighborhood of a vertex 62 under consideration should be relatively flat and unimportant to the overall shape of the multi-faceted surface (i.e., the neighborhood of the vertex does not include any peaks or valleys (bumpy regions) that may represent important topological features of the anatomic structure). For purposes of this disclosure, the term "neighborhood" is defined as the area of the multi-faceted surface that includes the vertex 62 being evaluated or considered (i.e., a central vertex) and all of the adjacent or surrounding vertices 62 that form an edge 64 with the vertex 62 being evaluated. To better illustrate this point, reference is made to FIG. 14 which illustrates the neighborhood of a vertex $62_1$. The neighborhood of the vertex $62_1$ comprises each of the surrounding vertices $62_2$-$62_7$, as each vertex $62_2$-$62_7$ forms an edge with the central vertex $62_1$.

In more specific terms, in an exemplary embodiment, the processing apparatus 16 evaluates the facet normal vectors of each facet 60 in the neighborhood of the vertex 62 under consideration to see whether or not the vectors are aligned or pointing in substantially the same direction (i.e., determine if the vectors are at least substantially or acceptably parallel with each other). Accordingly, if the vertex $62_1$ in FIG. 14 was the vertex being evaluated, the normal vectors of each neighboring facet 60 (i.e., facets $60_1$-$60_6$ in FIG. 14) are evaluated to see if they are aligned with each other. The alignment of the normal vectors in a given neighborhood is preliminary evidence of the neighborhood constituting at least a substantially flat area of the multi-faceted surface. On the other hand, the misalignment of the normal vectors is preliminary evidence of the neighborhood constituting a non-flat or bumpy area of the multi-faceted surface.

If the processing apparatus 16 determines that the normal vectors are misaligned, the processing apparatus 16 is configured to discard the vertex 62 being evaluated because its neighborhood does not meet the decimation criterion of comprising a relatively flat area that is unimportant to the overall shape of the multi-faceted surface. If the evaluated vertex 62 is discarded, the processing apparatus 16 moves to the next vertex 62 in the list and repeats the aforedescribed process. If, however, the processing apparatus 16 determines that the normal vectors are, in fact, aligned, and therefore, the decimation criterion are met, then the processing apparatus 16 is configured to place the evaluated vertex 62 into a decimation queue (Step 124).

Once each of the vertices 62 in the list has been evaluated and the decimation queue has been created, the vertices 62 in the decimation queue are prioritized relative to the each other to determine the order in which the vertices 62 in the queue are evaluated for decimation (Step 126). More particularly, the vertices 62 in the queue and their corresponding neighborhoods need to be prioritized such that those areas of the multi-faceted surface that are the flattest are decimated first.

In an exemplary embodiment, the processing apparatus 16 considers each vertex 62 in the queue, assigns each a value corresponding to a certain predetermined metric, and then sorts the vertices 62 according to the assigned metric values.

In one embodiment provided for exemplary purposes only, the metric employed relates to the distances between the vertices 62 in the neighborhoods of those vertices 62 in the decimation queue and the average planes corresponding to the respective neighborhoods. In such an embodiment, the processing apparatus 16 is configured to determine an average plane for the neighborhood of the vertex 62 from the decimation queue being considered. This may be done by fitting a plane to all of the vertices 62 in the neighborhood (excluding, however, the considered vertex 62). The processing apparatus 16 then measures or calculates the distance of each vertex 62 in the neighborhood from the average plane. The processing apparatus 16 then determines the maximum absolute distance from the average plane for the neighborhood. For example, if there are three vertices 62 in the neighborhood and they have the respective distances from the average plane of two millimeters above the plane (+2 mm), zero millimeters (0 mm), and two millimeters below the plane (−2 mm), the maximum absolute distance for the neighborhood corresponding to the considered vertex 62, and therefore, the maximum absolute distance assigned to the considered vertex 62 for prioritization purposes, is two millimeters (2 mm). Once the maximum absolute distance for a given vertex 62 in the queue has been determined, the processing apparatus 16 is configured to move to the next vertex 62 in the decimation queue and perform the same process of determining the maximum absolute distance for that vertex 62.

Once each vertex 62 in the queue has been considered and has been assigned a maximum absolute distance corresponding to its respective neighborhood, the processing apparatus 16 is configured to sort the vertices 62 in order of the smallest maximum absolute distance to the largest maximum absolute distance. Those vertices 62 with the smallest maximum absolute distances are deemed to be the highest priority (as they will represent the "flattest" or most co-planar areas of the multi-faceted surface), while those vertices 62 with the largest maximum absolute distances will be deemed to be the lowest priority for decimation purposes. In addition to basing the prioritization of the vertices on the metrics such as that described above (e.g., the maximum absolute distance from the average plane of the neighborhood), in an exemplary embodiment, the priority of the lowest-degree vertices—i.e., those vertices 62 having only a certain number of neighboring facets (e.g., three or four facets)—may be artificially increased so as to target them for preemptive decimation.

It will be appreciated that while the description above has been limited to the use of the maximum absolute distance from the average plane of the neighborhood as the metric for prioritizing the decimation queue, the present disclosure is not meant to be so limited. Rather, those of ordinary skill in the art will appreciate that other metrics may be used for prioritizing the decimation queue, and such other metrics remain within the spirit and scope of the present disclosure.

Once the decimation queue has been created and the vertices 62 therein prioritized, the processing apparatus 16 is configured to commence the actual decimation process. In an exemplary embodiment, and as illustrated in FIG. 13A, the processing apparatus 16 is configured to collapse the highest priority edge 64 in the multi-faceted surface of the surface model 58 (Step 130). More particularly, the processing apparatus 16 selects the highest priority vertex 62 in the queue (Step 127) and determines, based on the highest priority vertex 62, the highest priority edge 64 of the multi-faceted surface (Step 128). To do so, the processing apparatus 16 determines which of the vertices 62 that neighbor the highest priority vertex 62 (i.e., those vertices that with the highest priority vertex 62 form an edge 64 of a facet 60) is the closest in distance thereto. The edge 64 formed by the highest priority vertex 62 and the closest neighboring vertex 62 is the highest priority edge 64. The processing apparatus 16 then collapses the highest priority edge 64 by deleting the vertex 62 being evaluated (the highest priority vertex that was taken from the queue) from the multi-faceted surface and moving all of the incident edges 64 to the remaining vertex 62 of the highest priority edge 64 (i.e., the vertex 62 that was the closest neighboring vertex to the vertex 62 being evaluated) (Step 131). Thus, the remaining vertex 62 is now part of all of the edges 64 of which the deleted vertex was previous a part. As a result, the two facets 60 that shared the now-collapsed highest priority edge 64 are eliminated from the multi-faceted surface since the highest priority edge 64 no longer exists.

Figure 13B:
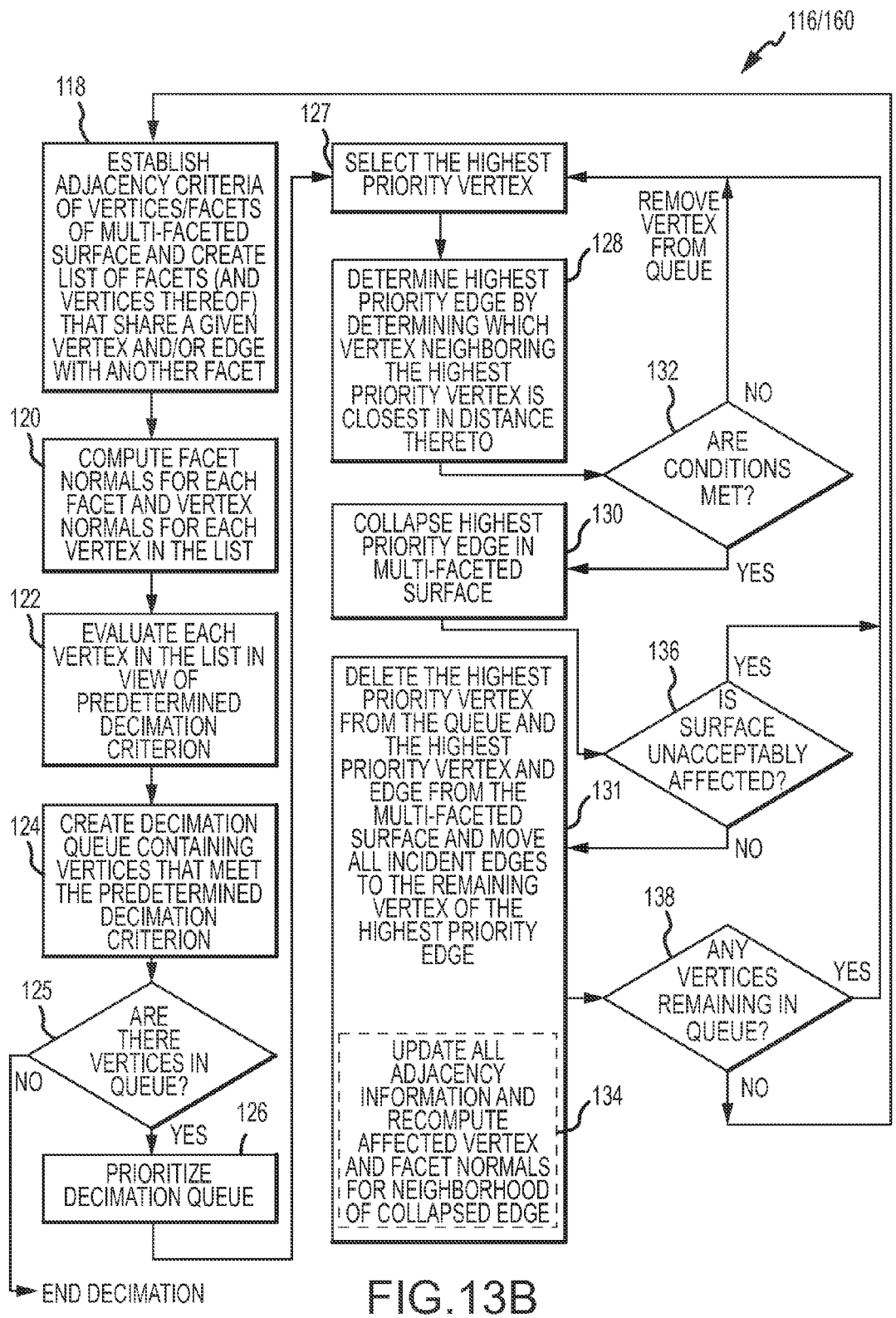

In an exemplary embodiment such as that illustrated in FIG. 13B, prior to deleting the highest priority vertex 62 and collapsing the highest priority edge 64, the processing apparatus 16 is configured to assess one or more predetermined conditions to determine if, in fact, the decimation process should be carried out for the highest priority vertex 62 being evaluated, or the highest priority edge 64 of which the highest priority vertex 62 and its closest neighboring vertex 62 are a part (Step 132 in FIG. 13B).

For example, in an exemplary embodiment, the processing apparatus 16 is configured to remove the highest priority vertex 62 being evaluated from the decimation queue (i.e., not perform the decimation process for that vertex 62) if the nearest neighboring vertex 62 (i.e., the closest vertex 62 that forms an edge 64 with the highest priority vertex 62) is determined by the processing apparatus 16 to be more than a predetermined threshold distance from the highest priority vertex 62. In such an instance, the highest priority vertex 62 is rejected and removed from the decimation queue. The threshold distance may be set as part of the set-up of the system 10, and the processing apparatus 16, in particular (i.e., during manufacture of the system 10 or during the initialization of the system 10 and prior to use). Further, the threshold distance may be non-adjustable or it may be adjustable by the user of the system 10 using, for example, the user interface 53 described above and best shown in FIG. 1. The threshold distance is on the order of millimeters. For instance, in one embodiment provided for exemplary purposes only, the threshold distance is four millimeters (4 mm). It will be appreciated, however, that embodiments wherein the threshold distance is greater than or less than 4 mm remain within the spirit and scope of the present disclosure. In an exemplary embodiment, if a vertex 62 is removed from the decimation queue as described above, the processing apparatus 16 is configured to stop the current iteration of the decimation process and then restart the process for a subsequent iteration as will be described below.

In addition, or alternatively, the processing apparatus 16 may be configured to determine whether the highest priority vertex 62 being evaluated was part of any edges 64 that were previously collapsed during the current iteration of the algorithm (i.e., during the current progression through the vertices in the decimation queue). If so, in an exemplary embodiment, the processing apparatus 16 removes the highest priority vertex 62 being evaluated from the decimation queue and repeats the aforedescribed process for the next highest priority vertex 62 in the queue. Conversely, if the highest priority vertex 62 being evaluated has not been part of a previously collapsed edge 64, then the process may continue as described above. The purpose of such a condition is to limit the effect of a single iteration of the decimation algorithm to at most one collapsed edge 64 per neighborhood.

Whether or not the processing apparatus 16 is configured to assess any predetermined conditions prior to collapsing an edge 64, in an exemplary embodiment, the processing apparatus 16 is configured to evaluate the effect the deletion of a vertex 62 and the resulting collapse of an edge 64 has on the multi-faceted surface (Step 136 in FIG. 13B). For example, the processing apparatus 16 may be configured to determine whether any of the surrounding facet orientations are perturbed by more than a predetermined threshold or acceptable amount, and if so, the processing apparatus 16 may be configured to undo the collapse. More particularly, the collapse of an edge 64 of the surface may result in artifacts such as, for example, facets 60 being inverted, narrowed, or stretched, all of which may be undesirable effects of the decimation process. Accordingly, a post-processing routine may be performed whereby the effect of the collapse of an edge 64 may be evaluated to determine whether or not the perturbation caused thereby is acceptable. One such routine may take into account the orientation of the affected facets 60. More particularly, the orientation of a facet 60 is measured by re-computing a facet normal vector for the facet 60, and then comparing the re-computed facet normal with its previous direction. Depending on the comparison, the processing apparatus 16 is configured to determine whether or not any perturbation exceeds the predetermined threshold, and if so, to potentially undo the collapse.

If there are no preceding conditions that must be evaluated and met, or such conditions exist and are satisfied, once an edge 64 is collapsed and, in an exemplary embodiment, the processing apparatus 16 determines that the collapse does not need to be undone, the processing apparatus 16 is configured to remove the deleted vertex 62 from the decimation queue and, as briefly described above, from the multi-faceted surface of the surface model 58 (Step 131). The processing apparatus 16 is further configured to then update all affected adjacency information and to re-compute all affected vertex normals in the neighborhood of the collapsed edge 64 (Sub-step 134 of Step 131), which, as will be described below, may be used by the processing apparatus 16 in an subsequent iteration of the decimation algorithm. Accordingly, this information may be stored, for example, in a memory that is associated with or accessible by the processing apparatus 16, such as, for example, the memory 47 illustrated in FIG. 1.

Once the decimation process described above has been completed for a given vertex 62, the processing apparatus 16 is configured to continue the current iteration of the decimation process by repeating the process in the same manner described above for the next highest priority vertex 62 in the decimation queue beginning at Step 127 described above.

Upon the completion of the above-described process for every vertex 62 in the decimation queue (i.e., completing an iteration of the process), or the current iteration of the decimation process is otherwise terminated (for reasons described above), the processing apparatus 16 terminates the current iteration of the decimation process and repeats the entire process in the same manner described above. It should be noted, however, that in an exemplary embodiment, some of the steps of the process will have already been performed during the most recent previous iteration, and thus, will not need to be repeated.

For example, in an exemplary embodiment, when a vertex 62 is deleted from the decimation queue and the multi-faceted surface of the surface model 58, the processing apparatus 16 is configured to update all affected adjacency information and to re-compute all affected vertex normals in the neighborhood of the collapsed edge 64. Thus, the adjacency information and vertex normals will not need to be updated or re-computed for those particular neighborhoods for which the adjacency information and vertex normals were updated during the previous iteration. Rather the processing apparatus 16 is configured to acquire the necessary information from, for example, a memory that is associated with or accessible by the processing apparatus 16, and in which the adjacency information is stored. Likewise, the adjacency information and vertex normals for those areas or neighborhoods of the surface model 58 unaffected by the previous iteration of the decimation process will also not need to be updated or re-computed since there would not be any change in the adjacency information and vertex normals for those areas or neighborhoods as a result of the previous iteration of the decimation process. Thus, in such an embodiment, the processing apparatus 16 would repeat the process starting at Step 122 described above and shown in FIGS. 13A and 13B.

The decimation process described above is an iterative process that may be repeated any number of times or iterations until there are no more vertices 62 in the multi-faceted surface that meet the decimation criterion (e.g., all of the vertices 62 are disposed in areas that are considered bumpy or at least not sufficiently flat). The decimation process may also cease once it is determined that the number of facets 60 comprising the multi-faceted surface meets a predetermined minimum number of facets, or the facets are large enough (i.e., every edge emanating from every vertex 62 that otherwise meets the decimation criterion exceeds a predetermined length (e.g. 4 mm)) that decimation would not be beneficial or desirable.

Figure 15:
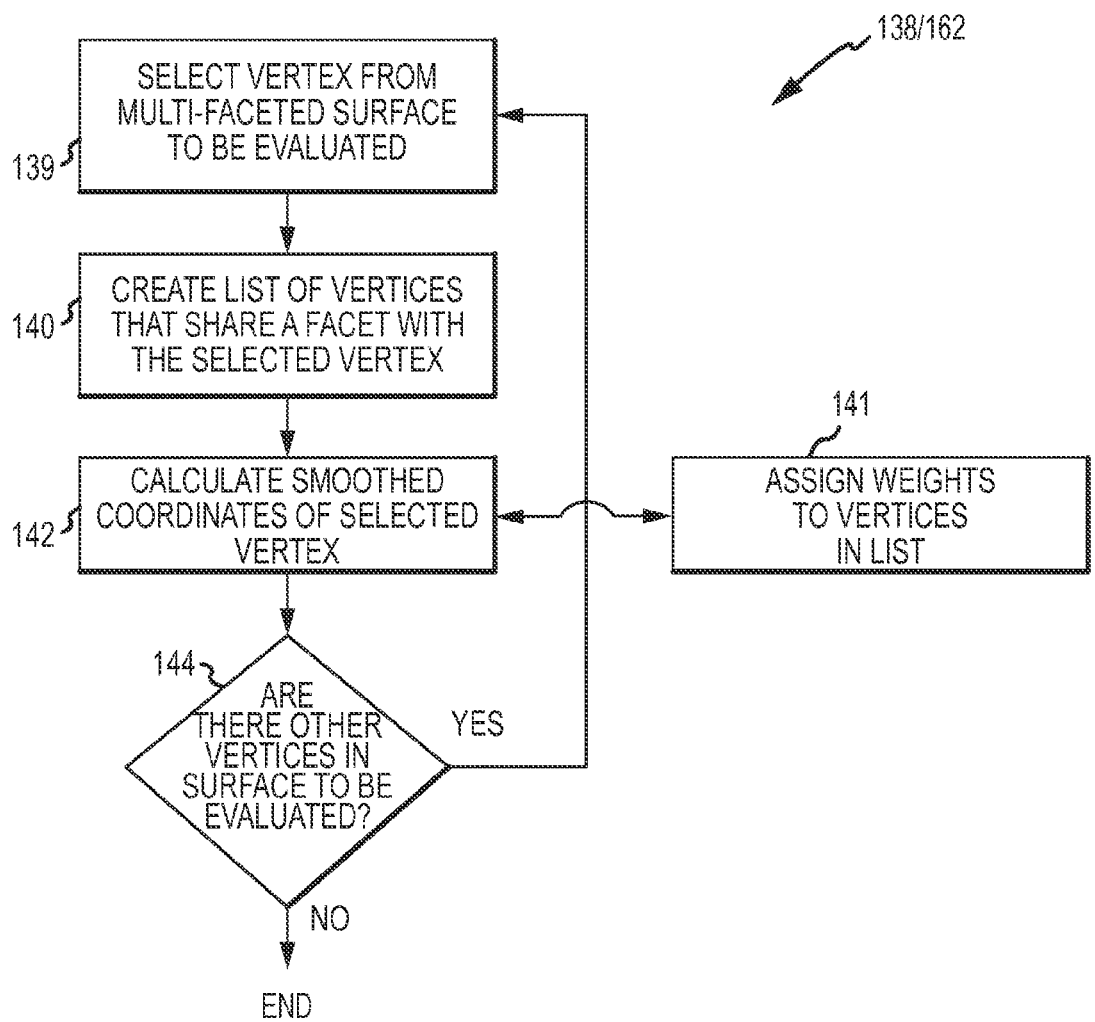
FIG. 15 is a flow diagram of an exemplary technique of smoothing a multi-faceted surface.

As illustrated in FIG. 5, in an exemplary embodiment, the processing apparatus 16 is configured to perform a smoothing operation on the facets 60 of the multi-faceted surface of the surface model 58 (Step 138). The smoothing operation may be performed regardless of whether the above-described decimation process is performed on the multi-faceted surface. In an exemplary embodiment wherein the multi-faceted surface is decimated, however, the smoothing operation is performed following the completion of the decimation process. In general terms, the smoothing operation functions, for example, to make the multi-faceted surface of the surface model 58 more uniform and regular, and to make the facets 60 nicer and less skewed. With reference to FIG. 15, in an exemplary embodiment, the multi-faceted surface is smoothed by employing a simple Laplacian relaxation technique that is known in the art. To summarize, however, the processing apparatus 16 is configured to evaluate each vertex 62 in the multi-faceted surface and to calculate smoothed coordinates corresponding thereto, which serves to smooth the multi-faceted surface.

More particularly, in an exemplary embodiment, the processing apparatus 16 is configured to select a vertex 62 to be evaluated (Step 139) and to create a list of vertices 62, and their respective (x, y, z) coordinates (i.e., each vertex 62 is transformed into three-dimensional space of integer coordinates) that share a facet 60 with the selected vertex 62 (Step 140). Accordingly, the list of vertices 62 for the selected vertex 62 (e.g., coordinates $(x_1, y_1, z_1)$) will include those vertices 62 that share a facet 60 with the selected vertex 62 (e.g., coordinates $(x_2, y_2, z_2), \ldots, (x_L, y_L, z_L)$, wherein "L" is the number of vertices 62 in the list). Once the list of vertices is created, the processing apparatus 16 is configured to calculate smoothed coordinates for the selected vertex (Step 142).

In an exemplary embodiment, the processing apparatus 16 is configured to calculate the smoothed coordinates by employing equation (12) below:

$$(x, y, z) = \sum_{l=1}^{L} w_l (x_l, y_l, z_l). \tag{12}$$

In equation (12), the term "$w_l$" is a weight value that is assigned to each vertex 62 that is part of the summing operation (Step 141). The weight value is always positive, and the sum of all the weights always equals one (1). The weight value will dictate which of the vertices 62 in the list will have the greater "pull" on the selected vertex 62, and therefore, toward which vertex or vertices 62 in the list the selected vertex 62 will be more strongly pulled. Accordingly, if the weights are equal or uniform, the pull of each vertex 62 in the list will be equal, while if some vertices 62 have greater weights than others, the pull of those vertices 62 having the greater weights will be stronger than the pull of the vertices 62 having lesser weights.

Figure 14:
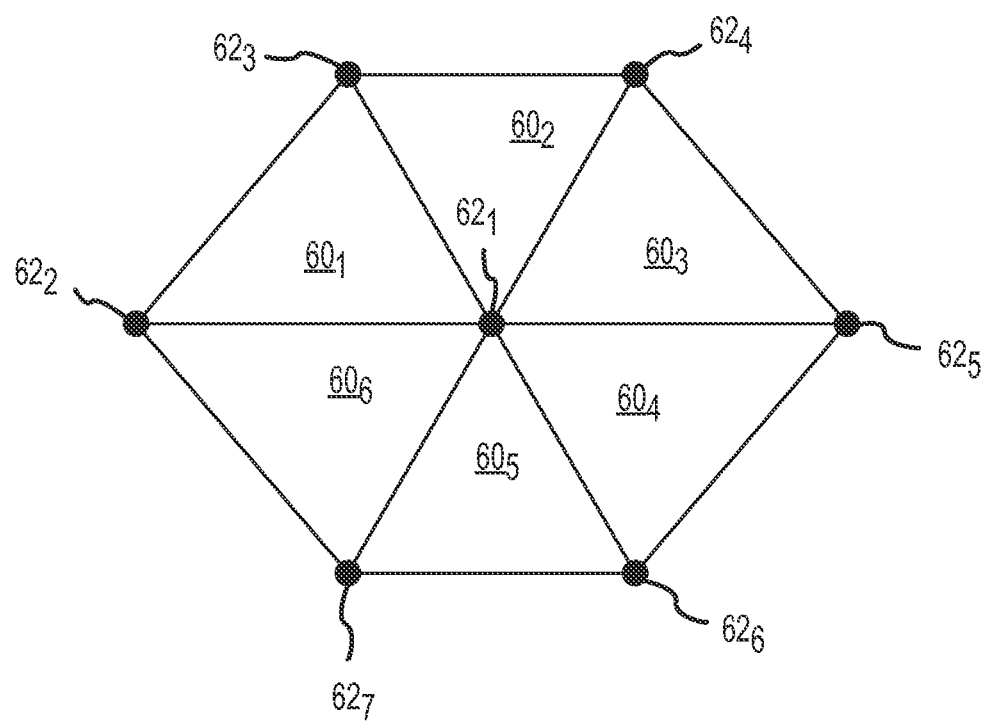
FIG. 14 is a schematic diagram of a neighborhood of vertices comprised of a center vertex and those vertices surrounding the center vertex and forming facet edges therewith.

The particular values of the weights may be dependent upon a number of factors. One factor may be the number of vertices 62 that are in the list, and therefore, that share a facet 60 with the selected vertex 62. For example, assume that the vertex $62_1$ in FIG. 14 is the selected vertex whose coordinates are being smoothed. Therefore, as illustrated in FIG. 14, there are six (6) vertices (vertices $62_2$-$62_7$) that share a facet 60 with the selected vertex $62_1$, and thus, there are six vertices in the list. Each of the vertices $62_2$-$62_7$ in the list is assigned a weight and the sum of those weights will equal the value of one (1). In an exemplary embodiment wherein each of the vertices in the list are part of the same surface (i.e., are in the same surface model 58), the weights of the vertices 62 will be uniform. Accordingly, in the present example, each of the six vertices $62_2$-$62_7$ will have a weight of "⅙" or (0.167).

Once the smoothed coordinates are determined for one vertex 62, the processing apparatus is configured to determine whether there are any other vertices 62 of the multi-faceted surface to be evaluated (Step 144), and to repeat the smoothing process described above for each remaining vertex 62 in the multi-faceted surface of the surface model 58 until every vertex 62 has been evaluated and their smoothed coordinates determined.

As briefly described above and as illustrated in FIG. 5, once surface models have been generated for the desired regions of the structure of interest using the techniques described above, for example, the processing apparatus 16 is configured to join the individual surface models together to form a composite surface model of the structure of interest (Step 102). In an exemplary embodiment, the processing apparatus 16 is configured to join the individual surface models together by computing or calculating a Boolean Union approximation corresponding to multi-faceted surfaces of the desired regions of interest of the structure of interest. In other words, the surface models 58 of the regions of interest are joined together by calculating or computing a three-dimensional Boolean Union approximation of the surface models 58.

Figure 16:
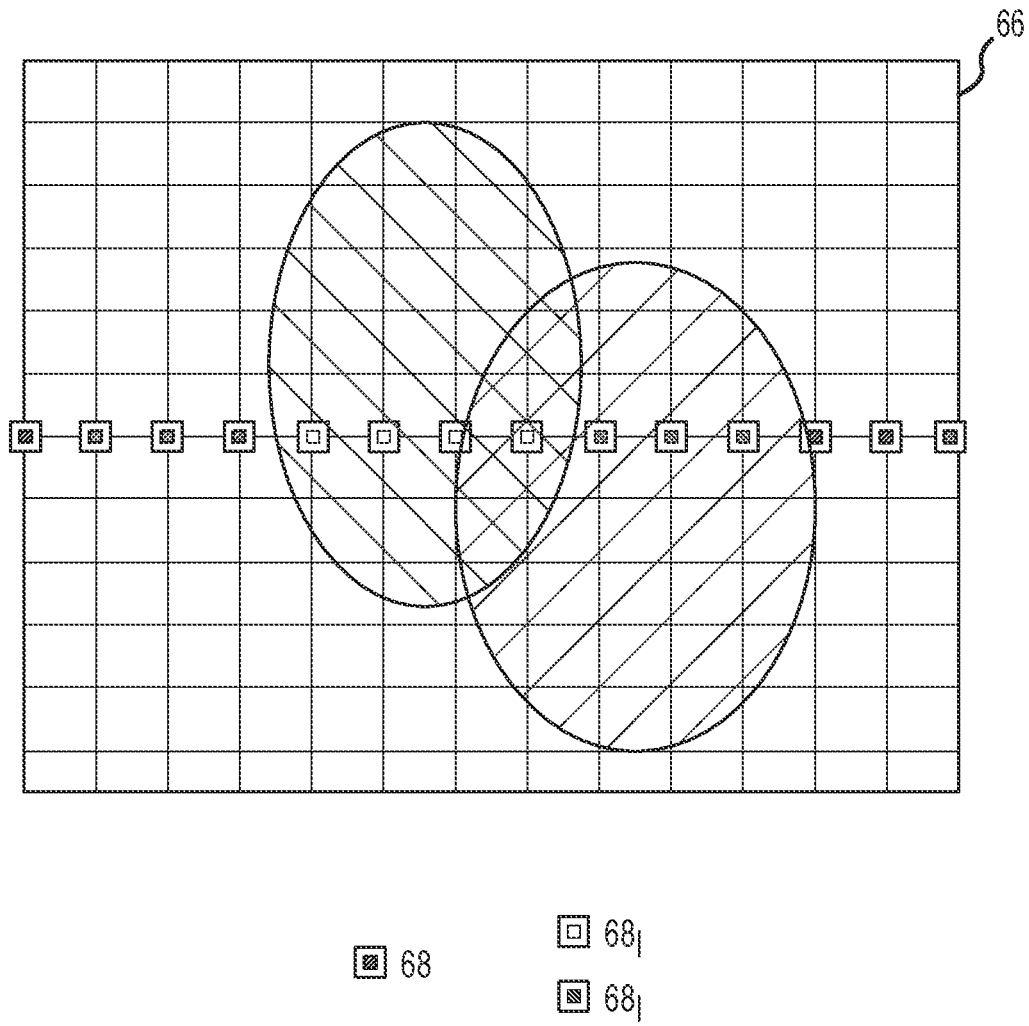
FIG. 16 is a schematic view of a voxel grid containing a pair of simplified, exemplary surface models and illustrating a ray casting technique of determining which voxels of the voxel grid are within the boundaries of those surface models.

In general terms, the processing apparatus 16 is configured to compute/calculate the Boolean Union approximation in much the same manner as that of the generation of the individual surface models 58 described above. More particularly, in an exemplary embodiment, the processing apparatus 16 is configured to first calculate or construct a grid of voxels from the multi-faceted surfaces corresponding to the individual regions of interest. In other words, two or more multi-faceted surfaces of two or more individual surface models are combined into one common voxel grid. For purposes of illustration, FIG. 16 depicts a voxel grid 66 calculated for a pair of simplified, oval-shaped surface models corresponding to different regions of a structure of interest that are to be joined to create a composite surface model. Once the voxel grid 66 is calculated or constructed, the processing apparatus 16 is configured to extract a single, composite multi-faceted surface model from the voxel grid 66 using, for example, a Marching Cubes algorithm. In an exemplary embodiment, the processing apparatus 16 is then configured to decimate and/or smooth the resulting multi-faceted surface in the same or similar manner as was described above with respect to the generation of the individual surface models 58.

Figure 17:
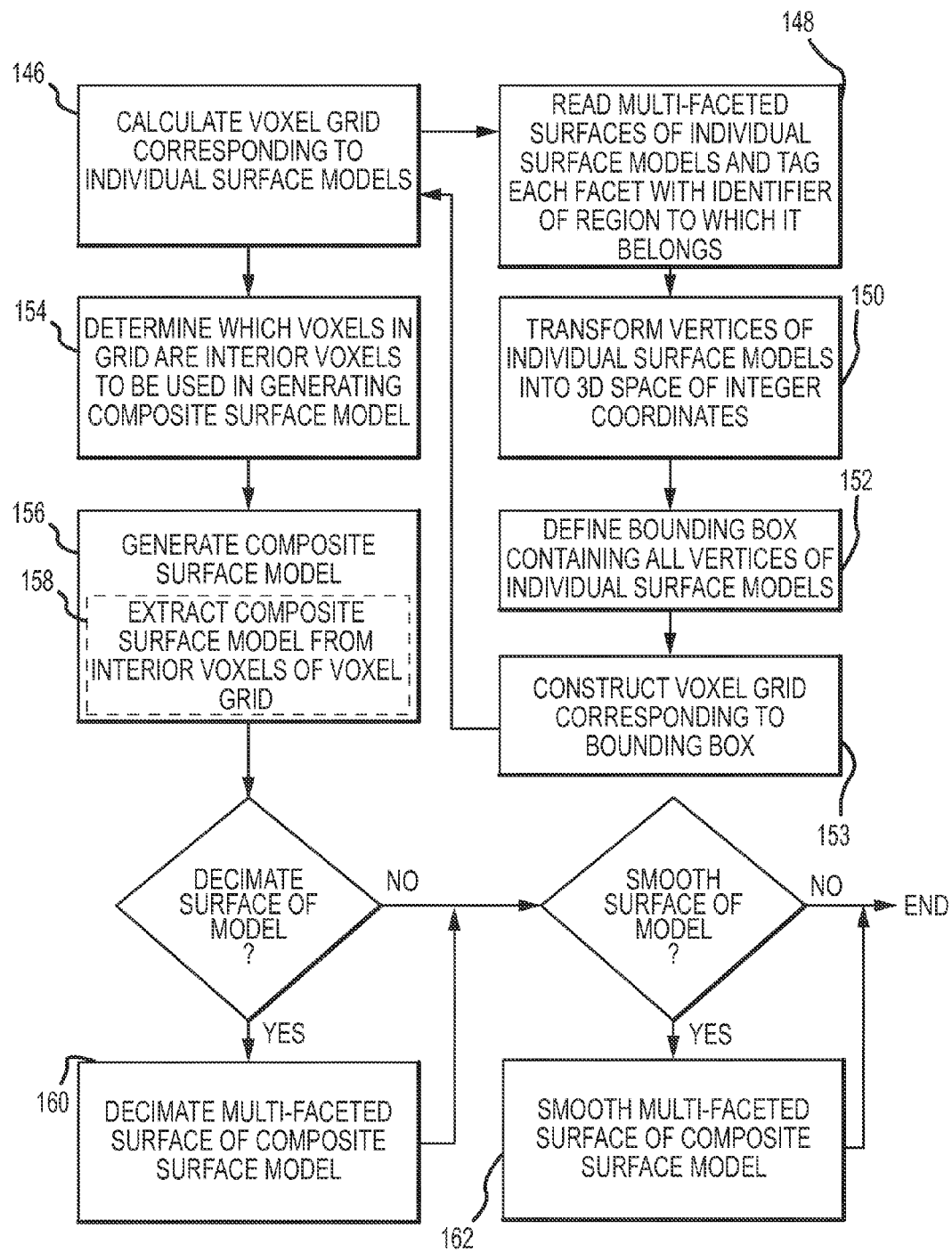
FIG. 17 is a flow diagram of an exemplary technique of joining a plurality of surface models together to form a composite surface model.

Accordingly, and with reference to FIG. 17, the processing apparatus 16 is configured to calculate or construct a binary voxel grid 66 containing a plurality of voxels 68 (Step 146) and to maintain an index that identifies the source of the values of the voxels, in much the same way as that described above with respect to the construction of the voxel grids of the individual surface models 58. More particularly, however, in an exemplary embodiment, the processing apparatus 16 is configured to read the multi-faceted surfaces of each of the individual surface models 58 being joined (Step 148) and, in an exemplary embodiment, to tag each facet of each individual surface model with an identifier of the region of interest to which the facet belongs. The processing apparatus 16 is configured to then transform each of the vertices 62 of the facets 60 in those individual multi-faceted surfaces into a three-dimensional space of integer coordinates (Step 150). In an exemplary embodiment, each integer coordinate is perturbed to force its value to be an even number for reasons such as those described below. The processing apparatus 16 is then configured to define a bounding box containing all of the vertices 62 of the surface models 58 that are being joined (Step 152).

In an exemplary embodiment, once the bounding box is defined, the Euclidean coordinates of the bounding box are determined (i.e., ($MIN_x$, $MIN_y$, $MIN_z$) and ($MAX_x$, $MAX_y$, $MAX_z$)). More particularly, the minimum and maximum values along each of the x-, y-, and z-axes are determined and used as the coordinates of the bounding box. Accordingly, to determine the x-coordinates of the bounding box, the processing apparatus 16 is configured to determine the vertex 62 of the individual surface models 58 that has the minimum "x value" of all the vertices 62 of the surface models 58, and the vertex 62 that has the maximum "x value" of all the vertices 62 in the surface models 58. The processing apparatus 16 then uses those respective minimum and maximum values as the minimum and maximum x-coordinates of the bounding box. The minimum and maximum y- and z-coordinates of the bounding box are determined in the same manner described above with respect to the x-coordinates.

In an exemplary embodiment, the bounding box may be padded or expanded in the same or similar manner as that described above with respect to the bounding box 52 (e.g., the bounding box may be padded to render the dimensions thereof integer multiples of the dimensions of the voxels that will comprise the voxel grid corresponding to the bounding box, or to simply expand the dimensions by one or more voxels). In such an instance, the coordinates of the expanded bounding box would be determined in much the same way as that described above with respect to the bounding box 52.

Following the determination of the coordinates of the bounding box, the processing apparatus 16 is configured to construct the voxel grid 66 within the bounding box (Step 153). The voxel grid 66 has a predetermined value of "v", which corresponds to the distance between each voxel 68 in the voxel grid 66 (each point at which the horizontal and vertical grid lines intersect in FIG. 16 constitutes a voxel 68). The value of v may be set as part of the set-up of the system 10, and the processing apparatus 16, in particular (i.e., during manufacture of the system 10 or during the initialization of the system 10 and prior to use). Further, the value may be non-adjustable or it may be adjustable by the user of the system 10 using, for example, the user interface 53 described above. In an exemplary embodiment, the value of v is on the order of 0.75 mm, however, the present disclosure is not meant to be so limited.

Once the voxel grid 66 containing both (or all) of the individual surface models 58 being joined is calculated, the processing apparatus 16 is configured to determine which of the voxels 68 of the grid 66 are interior to the multi-faceted surfaces being joined, and which of the voxels 68 are exterior (Step 154). In one exemplary embodiment, this is accomplished using a ray casting technique that is well known in the art. To summarize, however, the voxel grid 66 has dimensions given by I cells in the x-direction, J in the y-direction, and K cells in the z-direction. As such, and as was described above with respect to the voxel grid 54 and the voxels 56 thereof, each voxel 68 has an (i, j, k) index. In one exemplary embodiment, the ray casting technique involves casting a plurality of rays in the "i" direction. Each ray is centered on a respective point in the j-k plane, which is a cross-section of the voxel space itself on the side of the voxel grid 66 where i=0. Accordingly, the origin of the rays will have the coordinates (0, $MIN_y$+jv, $MIN_z$+kv). In an exemplary embodiment, the origin of each ray will be forced to be an odd number because the coordinates of the vertices 62 of the individual surface models are even numbers (as briefly described above). This is done to ensure that a ray will never contain a vertex 62 of a facet 60 of the surface models.

Each ray is cast from a respective point on the j-k plane with i=0 until the ray reaches the other side of the voxel grid where i=I (which is the number of voxels in the "i" direction of the grid). The j and k coordinates of the ray remain constant along the length of the ray. The maximum number of rays that are cast is a function of the dimensions of the voxel grid 66. Accordingly, because the voxel grid 66 has the dimensions J-K, the maximum possible number of rays cast during the ray casting technique will be J×K.

Each ray is used to determine a set of voxels 68 along the "i" direction that lie inside the solids whose boundary is defined by the multi-faceted surfaces of the individual surface models 58. FIG. 16 illustrates a ray casting process and depicts the differentiation of those voxels 68 that were determined to be within the boundary of one or more of the solids contained within the voxel grid 66 (voxels 68$_I$) from those voxels 68 that were determined to be outside of the solids. Those voxels 68 determined to be within at least one of the solids will be used to generate the composite surface model, as will be described below. The values of each of these voxels 68$_I$ is set to one (1) and the respective sets of voxels 68$_I$ corresponding to each solid will be identified with the index of the solid that contains the set of voxels 68$_I$.

During the ray-casting process, a ray may intersect an edge that is shared by two facets 60. The problem this presents is that the intersection point cannot be part of both facets 60. Accordingly, in such an instance, a determination or designation must be made as to which facet 60 the point at which the intersection occurs will belong. In any case, the process for making this determination or designation must be uniformly applied to ensure consistency. One exemplary technique that may be applied to make this determination is the introduction of a perturbation to the location of the ray. More particularly, in an exemplary embodiment, an infinitesimal perturbation may be applied to the z-location of the ray, for example. By perturbing the location of the ray, the ray will no longer intersect a shared edge, rather the ray will be offset from the edge and will then be part of only one of the two facets 60 sharing the edge that was initially intersected by the ray. The perturbation to the location of the ray may be done by analyzing the sign of the cross product of the edge and the ray, and then effecting the perturbation accordingly.

It will be appreciated that while the description above is with respect to the centering of the rays on points in the j-k plane and casting of the rays in the "i" direction, in other exemplary embodiments, the rays may be centered on any of the i-j, i-k, or j-k planes, or the rays may be non-axis aligned (e.g., the data could be transformed to another coordinate system) and as such, these embodiments remain within the spirit and scope of the present disclosure.

Once the processing apparatus 16 determines which voxels 68 (i.e., 68$_I$) to use in the generation of the composite surface model (i.e., the Boolean Union approximation), in an exemplary embodiment, the processing apparatus 16 is configured to generate the composite surface model (Step 156) in substantially the same manner as the individual surface models 58 were generated.

Figure 18:
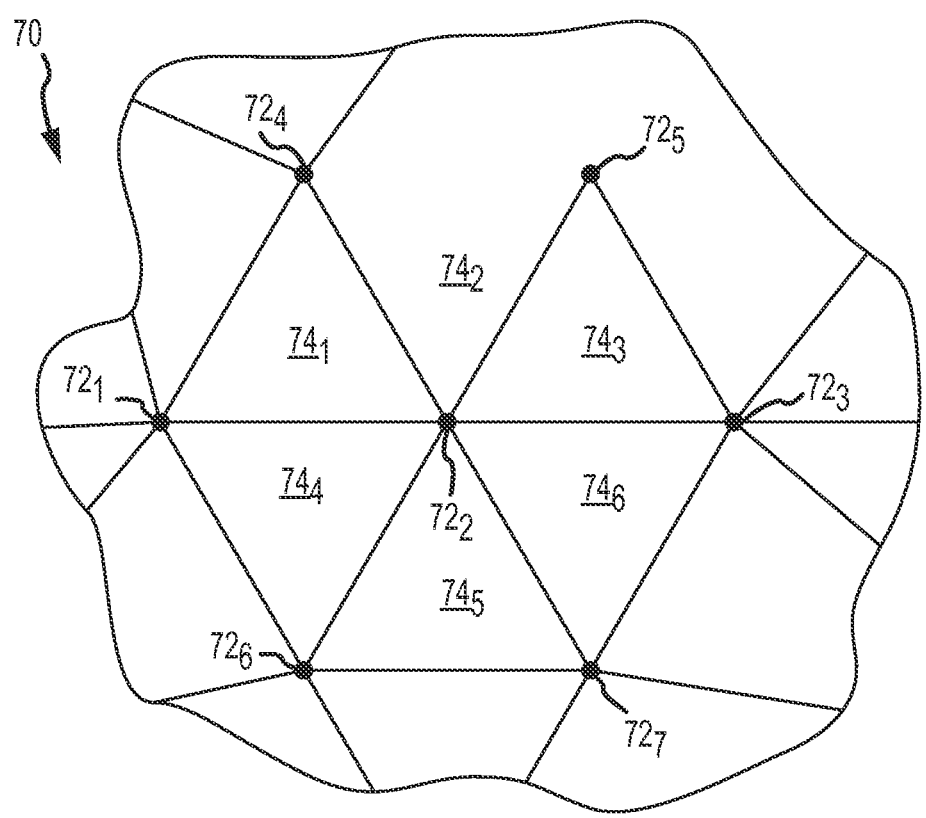
FIG. 18 is a schematic view of a portion of a multi-faceted surface of an exemplary composite surface model.

Accordingly, in an exemplary embodiment, the processing apparatus 16 is configured to process the voxels 68$_I$ to extract a composite surface model 70 corresponding to the voxels 68$_I$ (Step 158). FIG. 18 depicts a portion of a multi-faceted surface of an exemplary composite surface model 70. The composite surface model 70 has a multi-faceted surface wherein each voxel 68$_I$ of the voxel grid 66 comprises a vertex 72 in the composite surface model 70. In an exemplary embodiment, the facets 74 of the multi-faceted surface have a triangular shape, although the present disclosure is not meant to be so limited.

In an exemplary embodiment, the processing apparatus 16 is configured to extract the composite surface model 70 from the voxels 68$_I$ using, for example, the Marching Cubes technique. It will be appreciated, however, that techniques other than the Marching Cubes technique may be used to extract or otherwise generate the composite surface model 70 from the voxels 68$_I$, and these techniques remain within the spirit and scope of the present disclosure.

As with the generation of the individual surface models 58 described above, in an exemplary embodiment, the processing apparatus 16 is configured to perform post-extraction or post-generation processing operations on the multi-faceted surface of the composite surface model 70. For example, the processing apparatus 16 may be configured to decimate excess facets 74 from the multi-faceted surface of the composite surface model 70 (Step 160). In an embodiment wherein the processing apparatus 16 is configured to perform a decimation process, it may employ the specific technique described in great detail above with respect to the decimation of the multi-faceted surfaces of the individual surface models 58. Accordingly, each vertex 72 and/or facet 74 of the multi-faceted surface of the composite surface model 70 would be evaluated or considered in the same manner described above with respect to the decimation of the individual surface models 58, and the multi-faceted surfaces thereof, in particular. As such, the description set forth above applies here with equal force, and will not be repeated, but rather is incorporated by reference.

Whether or not the multi-faceted surface of the composite surface model 70 is decimated, in an exemplary embodiment, the processing apparatus 16 is configured to perform a smoothing operation on the multi-faceted surface of the composite surface model 70 (Step 162). As described above, the smoothing operation functions, for example, to make the multi-faceted surface of the composite surface model 70 more uniform and regular, to make the facets 74 nicer and less skewed, and, in addition, to massage the areas where the composite surface model 70 transitions between what would be the individual surface models 58.

With reference to FIG. 15, and as described above with respect to the smoothing of the multi-faceted surfaces of individual surface models 58, in an exemplary embodiment, the multi-faceted surface may be smoothed using any number of techniques known in the art, such as, for example and without limitation, a Laplacian relaxation technique. To summarize, however, the processing apparatus 16 is configured to evaluate each vertex 72 in the multi-faceted surface and to calculate smoothed coordinates corresponding thereto, which serves to smooth the multi-faceted surface.

More particularly, the processing apparatus 16 is configured to select a vertex 72 to be evaluated (Step 139), and to create a list of vertices 72, and their respective (x, y, z) coordinates (i.e., each vertex 72 is transformed into three-dimensional space of integer coordinates) that share a facet 74 with the selected vertex 72 (Step 140). Accordingly, the list of vertices 72 for the selected vertex 72 (e.g., coordinates $(x_1, y_1, z_1)$) will include those vertices 72 that share a facet 74 with the selected vertex 72 (e.g., coordinates $(x_2, y_2, z_2), \ldots, (x_L, y_L, z_L)$, wherein "L" is the number of vertices 72 in the list). Once the list of vertices is created, the processing apparatus 16 is configured to calculate smoothed coordinates for the selected vertex (Step 142).

In an exemplary embodiment, the processing apparatus 16 is configured to do so by employing equation (12) set forth above. As described above, the term "$w_i$" in equation (12) is a weight value that is assigned to each vertex 72 that is part of the summing operation (Step 141). The weight value is always positive, and the sum of all the weights always equals one (1). As described above, the weight values will dictate which of the vertices 72 in the list will have the greatest pull on the selected vertex 72, and therefore, toward which vertex or vertices 72 in the list the selected vertex 72 will be more strongly pulled. Accordingly, if the weights are equal or uniform, the pull of each vertex 72 in the list will be equal, while if some vertices 72 have greater weights than others, the pull of those vertices 72 having the greater weights will be stronger than the pull of the vertices 72 having lesser weights.

The particular values of the weights may be dependent upon a number of factors. One factor may be the number of vertices 72 that are in the list, and therefore, that share a facet 74 with the selected vertex 72. For example, and for the sake of illustration, assume that the vertex 72$_2$ in FIG. 18 is the selected vertex whose coordinates are being smoothed. Therefore, as illustrated in FIG. 18, there are six (6) vertices (vertices $72_1$ and $72_3$-$72_7$) that share a facet 74 with the selected vertex $72_2$, and thus, there are six vertices in the list. Each of the vertices $72_1$ and $72_3$-$72_7$ in the list is assigned a weight and the sum of those weights will equal the value of one (1). In an exemplary embodiment wherein each of the vertices in the list are part of the same surface (i.e., are from same surface model 58), the weights of the vertices 72 will be uniform. Accordingly, in the present example, each of the six vertices $72_1$ and $72_3$-$72_7$ will have a weight of ⅙ (or 0.167).

Another factor that is applicable only with respect to the performance of the smoothing operation on a composite surface model, is whether or not the selected vertex 72 is shared by two distinct surfaces being joined (i.e., the vertex 72 is shared by both surface models 58 when they are joined together to form a composite surface model 70). In such an instance, those vertices 72 in the list of vertices that are also shared by the two distinct surfaces being joined will be assigned weights that are greater than those vertices 72 that are not shared by the two surfaces.

For example, and for the sake of illustration, assume that the vertex $72_2$ in FIG. 18 is the selected vertex whose coordinates are being smoothed. Therefore, as illustrated in FIG. 18, there are six (6) vertices (vertices $72_1$ and $72_3$-$72_7$) that share a facet 74 with the selected vertex $72_2$, and thus, there are six vertices in the list. Each of the vertices $72_1$ and $72_3$-$72_7$ in the list is assigned a weight and the sum of those weights will equal the value of one (1). Assume further that the facets $74_1$-$74_3$ of the composite surface model 70 are from one individual surface model, while facets $74_4$-$74_6$ are from another individual surface model. Accordingly, each of the vertices $72_1$-$72_3$ are shared by both surface models that are joined together to form the composite surface model 70. Accordingly, each of the vertices $72_1$ and $72_3$ would be assigned a weight that differs from, and is greater than, the weights of the remaining vertices 72 (vertices $72_4$-$72_7$). For example, in one exemplary embodiment, each of the vertices $72_1$ and $72_3$ may be assigned a weight of "48/100" or (0.48) while the remaining vertices 72 in the list may each be assigned a weight of ("1/100") or (0.01). In view of these weights, the selected vertex $72_2$ would be pulled more strongly towards both vertices $72_1$ and $72_3$ in a taut line to form a smooth boundary. It will be appreciated that the specific weights set forth above are exemplary only and are not meant to be limiting in nature. In practice, the weights may be adjusted to cause the boundary to be more or less taut.

In any event, once the appropriate weights are assigned, the equation (12) may be executed to determine the smoothed coordinates for the given selected vertex 72. Once the smoothed coordinates are determined for one vertex 72, the processing apparatus 16 is configured to determine whether there are any other vertices 72 of the multi-faceted surface to be evaluated (Step 144), and to repeat the smoothing process described above for each remaining vertex 72 in the multi-faceted surface of the composite surface model 70 until every vertex 72 has been evaluated and their smoothed coordinates determined.

Once the smoothing operation is complete, the generation of the composite surface model 70 is also complete, and the result is a three-dimensional composite surface model of the structure of interest.

It will be appreciated that in addition to the structure of the system 10 described above, another aspect of the present disclosure is a method for generating a three-dimensional surface model of one or more geometric structures. In an exemplary embodiment, and as described above, the model construction system 14 of the system 10, and the processing apparatus 16 thereof, in particular, is configured to perform the methodology. However, in other exemplary embodiments, the processing apparatus 16 is configured to perform some, but not all, of the methodology. In such an embodiment, another component or components that is/are part of the system 10 or the model construction system 14 thereof, or that is/are configured for communication with the system 10, and the processing apparatus 16 thereof, in particular, is/are configured to perform some of the methodology.

In either instance, and with reference to FIG. 5, in an exemplary embodiment the method in its most general form includes a step 100 of generating three-dimensional surface models for each region of interest of a structure of interest. In an exemplary embodiment wherein multiple surface models of multiple regions of interest are generated, the method may comprise a step 102 of joining the individual surface models together to form a composite surface model of the structure of interest.

In an exemplary embodiment, the generating step 100 comprises a substep 104 of acquiring a set of location data points for each region of interest of the structure of interest. Each set of location data points comprises a plurality of location data points corresponding to respective locations on the surface of the respective region of interest to which the set of location data points corresponds. The location data points may be acquired in a number of ways. In one exemplary embodiment, the acquiring step may comprise obtaining the location data points from a memory or storage device. In another exemplary embodiment, the acquiring step may comprise collecting the location data points from the respective surfaces of the regions of interest using, for example, a catheter-mounted sensor. For purposes of illustration and ease of description, and for the sake of brevity, the description below will be with respect to a single set of location data points. It will be appreciated, however, that the following description applies to each set of location data points that are being used to generate surface models of regions of interest of the structure of interest. Therefore, the steps of the methodology set forth below are performed for each acquired set of location data points.

Once the set of location data points is acquired, the generating step 100 includes a substep 106 of constructing a voxel grid corresponding to the acquired set of location data points. The voxel grid comprises a plurality of voxels, and the generating step 100 includes a substep 108 of determining or identifying which voxels of the voxel grid are to be used in generating the surface model of the region of interest. Various techniques may be used to determine or identify those voxels to be used in generating the surface model, including, for example and without limitation, those techniques described above with respect to the generation of the surface model 58. Following the identification of voxels in substep 108, the generating step 100 includes a substep 110 of generating a multi-faceted surface model for the region of interest. In an exemplary embodiment, the substep 110 may comprise generating the multi-faceted surface model by computing/calculating or extracting the alpha-hull approximation from the voxels of the voxel grid identified in substep 108. It will be appreciated, however, that other techniques known in the art may be used and such techniques remain within the spirit and scope of the present disclosure.

Once the surface model of the region of interest is generated, a number of post-generation operations may be performed on the multi-faceted surface of the surface model. For example, in an exemplary embodiment, the method comprises a step 116 of decimating the multi-faceted surface of the surface model to remove excess facets therefrom. The decimation step 116 may comprise, for example and without limitation, the steps described above and illustrated in FIGS. 13A and 13B with respect to the decimation of the multi-faceted surface of the surface model 58. As such, the description set forth above will not be repeated, but rather is incorporated here by reference.

Whether or not the multi-faceted surface of the surface model generated in step 100 is decimated, another post-generation operation that may be performed on the multi-faceted surface of the surface model is a smoothing operation. Accordingly, in an exemplary embodiment, the method comprises a smoothing step 138. The smoothing step may comprise, for example and without limitation, the steps described above and illustrated in FIG. 15 with respect to the smoothing of the multi-faceted surface of the surface model 58. As such, the description set forth above will not be repeated, but rather is incorporated here by reference.

In an exemplary embodiment, once surface models are generated for each region of interest of the structure of interest, the step 102 of joining the individual surface models together to form a composite surface model may be performed. In an exemplary embodiment, the joining step 102 comprises calculating or computing a Boolean Union approximation of the individual surface models.

The joining step 102 may comprise a number of substeps. In an exemplary embodiment such as that described above and illustrated in FIG. 17 with respect to the generation of the composite surface model 70, and in relatively general terms, the joining step 102 comprises a substep 146 of calculating or constructing a voxel grid comprised of a plurality of voxels corresponding to and containing the individual surface models of the regions of interest of the structure of interest. In an exemplary embodiment, substep 146 comprises a step 148 of reading the multi-faceted surface of the individual surface models, a step 150 of transforming the vertices of each individual surface model into three-dimensional space of integer coordinates, a step 152 of defining a bounding box containing those vertices, and finally a step 153 of computing or calculating the voxel grid corresponding to the defined bounding box.

Once the voxel grid is constructed, in an exemplary embodiment, the joining step 102 includes a substep 154 of determining or identifying which voxels of the voxel grid are to be used in generating the composite surface model. Various techniques may be used to determine or identify those voxels to be used in generating the surface model, including, for example and without limitation, the ray casting technique described above with respect to the generation of the composite surface model 70. Following the identification of voxels in substep 154, the joining step 102 includes a substep 156 of generating a multi-faceted composite surface model for the structure of interest. In an exemplary embodiment, the substep 156 may comprise the step 158 of extracting the multi-faceted surface model from the voxels of the voxel grid identified in substep 154 using, for example and without limitation, the Marching Cubes technique. It will be appreciated, however, that other techniques known in the art may be used and such techniques remain within the spirit and scope of the present disclosure.

As with the individual surface models described above, once the composite surface model of the structure of interest is generated, a number of post-generation operations may be performed on the multi-faceted surface of the composite surface model. For example, in an exemplary embodiment, the method comprises a step 160 of decimating the multi-faceted surface of the surface model to remove excess facets therefrom. The decimation step 160 may comprise, for example and without limitation, the steps described above and illustrated in FIGS. 13A and 13B with respect to the decimation of the multi-faceted surfaces of the surface model 58 and the composite surface model 70. As such, the description set forth above will not be repeated, but rather is incorporated here by reference.

Whether or not the multi-faceted surface of the composite surface model is decimated, another post-generation operation that may be performed is a smoothing operation. Accordingly, in an exemplary embodiment, the method comprises a smoothing step 162. The smoothing step 162 may comprise, for example and without limitation, the steps described above and illustrated in FIG. 15 with respect to the smoothing of the multi-faceted surfaces of the surface model 58 and the composite surface model 70. As such, the description set forth above will not be repeated, but rather is incorporated here by reference.

It will be appreciated that additional functionality described in greater detail above with respect to the system 10, and the model construction system 14 and processing apparatus 16, thereof, in particular, may also be part of the inventive methodology. Therefore, to the extent such functionality has not been expressly described with respect to the methodology, the description thereof above is incorporated here by reference.

It should be understood that the model construction system 14, and particularly the processing apparatus 16, as described above may include conventional processing apparatus known in the art, capable of executing pre-programmed instructions stored in an associated memory, all performing in accordance with the functionality described herein. It is contemplated that the methods described herein, including without limitation the method steps of embodiments of the invention, will be programmed in a preferred embodiment, with the resulting software being stored in an associated memory and where so described, may also constitute the means for performing such methods. Implementation of the invention, in software, in view of the foregoing enabling description, would require no more than routine application of programming skills by one of ordinary skill in the art. Such a system may further be of the type having both ROM, RAM, a combination of non-volatile and volatile (modifiable) memory so that the software can be stored and yet allow storage and processing of dynamically produced data and/or signals.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily infer that two elements are directly connected/coupled and in fixed relation to each other. Additionally, the terms electrically connected and in communication are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

What is claimed is:

1. A computer-implemented method of constructing a bounding box corresponding to a plurality of location data points, said method comprising:

acquiring a set of location data points comprising a plurality of sensed location data points;

adding, for each sensed location data point in said set of location data points, at least one calculated location data point to said set of location data points, wherein each calculated data point added for a respective sensed location data point is separated from the respective sensed location data point along at least one axis, further wherein a distance along each axis between each calculated data point and the respective sensor location data point is either zero or a predetermined equal distance;

defining a three-dimensional bounding box containing each of said sensed location data points and said calculated location data points in said set of location data points; and generating a surface model based at least in part on said three-dimensional bounding box.

2. The method of claim 1 further comprising the step of expanding said bounding box by a predetermined distance along at least one axis thereof.

3. The method of claim 2, wherein said expanding step comprises expanding said bounding box by a predetermined distance along a plurality of axes thereof.

4. The method of claim 2, wherein said expanding step comprises expanding said bounding box to render the dimensions thereof integer multiples of the dimensions of a voxel of a voxel grid constructed to correspond to said bounding box.

5. The method of claim 1, wherein said adding step comprises adding, for at least one of said sensed location data points in said set of location data points, a plurality of calculated location data points to said set of location data points, wherein each calculated data point added for a respective sensed location data point is separated from the respective sensed location data point along at least one axis, further wherein a distance along each axis between each calculated data point and the respective sensor location data point is either zero or a predetermined equal distance.

6. The method of claim 5, wherein said adding step comprises adding said plurality of calculated data points along a first axis corresponding to said sensed location data point.

7. The method of claim 5, wherein said adding step comprises adding said plurality of calculated data points along a plurality of axes corresponding to said sensed location data point.

8. A system for constructing a bounding box corresponding to a plurality of location data points, comprising
a processing apparatus configured to:
acquire a set of location data points comprising a plurality of sensed location data points;
add, for each sensed location data point in said set of location data points, at least one calculated location data point to said set of location data points, wherein each calculated data point added for a respective sensed location data point is separated from the respective sensed location data point along at least one axis, further wherein a distance along each axis between each calculated data point and the respective sensor location data point is either zero or a predetermined equal distance;
define a three-dimensional bounding box containing each of said sensed location data points and said calculated location data points in said set of location data points; and generating a surface model based at least in part on said three-dimensional bounding box.

9. The system of claim 8, wherein said processing apparatus is further configured to expand said bounding box by a predetermined distance along at least one axis thereof.

10. The system of claim 9, wherein processing apparatus is configured to expand said bounding box by a predetermined distance along a plurality of axes thereof.

11. The system of claim 9, wherein processing apparatus is configured to expand said bounding box to render the dimensions thereof integer multiples of the dimensions of a voxel of a voxel grid constructed to correspond to said bounding box.

12. The system of claim 8, wherein said processing apparatus is further configured to add, for at least one of said sensed location data points in said set of location data points, a plurality of calculated location data points to said set of location data points, wherein each calculated data point added for a respective sensed location data point is separated from the respective sensed location data point along at least one axis, further wherein a distance along each axis between each calculated data point and the respective sensor location data point is either zero or a predetermined equal distance.

13. The system of claim 12, wherein said processing apparatus is configured to add said plurality of calculated data points along a first axis corresponding to said sensed location data point.

14. The system of claim 12, wherein said processing apparatus is configured to add said plurality of calculated data points along a plurality of axes corresponding to said sensed location data point.

15. A computer-implemented method of identifying voxels in a voxel grid corresponding to a plurality of location data points from which to extract a multi-faceted surface model, said method comprising:
calculating, for each location data point, a distance between said location data point and each voxel in said voxel grid;
creating a first subset of voxels comprising those voxels having a distance from at least one of said location data points that is less than a first predetermined distance;
creating a second subset of voxels comprising those voxels not in said first subset and that neighbor at least one of said voxels in said first subset;
computing, for each voxel in said second subset, a distance between said voxel and each voxel in said first subset;
identifying each voxel in said first subset of voxels that is a distance away from each of said voxels in said second subset that exceeds a second predetermined distance; and generating a surface model based at least in part on at least one of said voxels in said first subset or said second subset.

16. The method of claim 15, further comprising the steps of:
acquiring said plurality of location data points; and
constructing said voxel grid corresponding to said plurality of location data points.

17. The method of claim 16 further comprising the step of defining a bounding box containing each of said location data points, and wherein said constructing said voxel grid step comprises constructing said voxel grid corresponding to said bounding box.

18. A system for identifying voxels in a voxel grid corresponding to a plurality of location data points from which to extract a multi-faceted surface model, comprising
a processing apparatus configured to:
calculate, for each location data point, a distance between said location data point and each voxel in said voxel grid;
create a first subset of voxels comprising those voxels having a distance from at least one of said location data points that is less than a first predetermined distance;

create a second subset of voxels comprising those voxels not in said first subset and that neighbor at least one of said voxels in said first subset;

compute, for each voxel in said second subset, a distance between said voxel and each voxel in said first subset;

identify each voxel in said first subset of voxels that is a distance away from each of said voxels in said second subset that exceeds a second predetermined distance; and generate a surface model based at least in part on at least one of said voxels in said first subset or said second subset.

19. The system of claim 18, wherein said processing apparatus is further configured to:

acquire said plurality of location data points; and construct said voxel grid corresponding to said plurality of location data points.

20. The system of claim 19, wherein said processing apparatus is further configured to define a bounding box containing each of said location data points, and to construct said voxel grid corresponding to said bounding box.

* * * * *